US012036185B2

(12) United States Patent
Mahar et al.

(10) Patent No.: US 12,036,185 B2
(45) Date of Patent: Jul. 16, 2024

(54) SYSTEM AND METHOD TO COUNT PILLS

(71) Applicant: Optum, Inc., Minnetonka, MN (US)

(72) Inventors: Michael L Mahar, Tempe, AZ (US); Toan Q. Trinh, Phoenix, AZ (US)

(73) Assignee: OPTUM, INC., Minnetonka, MN (US)

( * ) Notice: Subject to any disclaimer, the term of this patent is extended or adjusted under 35 U.S.C. 154(b) by 0 days.

(21) Appl. No.: 17/862,556

(22) Filed: Jul. 12, 2022

(65) Prior Publication Data

US 2023/0017452 A1 Jan. 19, 2023

Related U.S. Application Data

(60) Provisional application No. 63/223,190, filed on Jul. 19, 2021.

(51) Int. Cl.

| | |
|---|---|
| ***A61J 7/02*** | (2006.01) |
| ***A61J 1/03*** | (2023.01) |
| ***G06M 3/02*** | (2006.01) |

(52) U.S. Cl.

CPC . *A61J 7/02* (2013.01); *A61J 1/03* (2013.01); *G06M 3/02* (2013.01); *A61J 2200/70* (2013.01)

(58) Field of Classification Search

CPC . G06K 7/10722; A61J 7/02; A61J 1/03; A61J 7/0454; A61J 7/0076; A61J 2200/70; A61J 7/0084; A61J 2205/40; A61J 3/007; G06M 3/02; G06M 7/02; G06M 1/272

See application file for complete search history.

(56) References Cited

U.S. PATENT DOCUMENTS

| | | |
|---|---|---|
| 3,677,437 A | 7/1972 | Haigler |
| 3,900,718 A | 8/1975 | Seward |
| 3,917,045 A | 11/1975 | Williams et al. |

(Continued)

FOREIGN PATENT DOCUMENTS

| | | | |
|---|---|---|---|
| EP | 3109623 A2 * | 12/2016 | ............ A61J 7/0076 |
| GB | 2497158 A * | 6/2013 | ............... B65B 1/08 |

(Continued)

OTHER PUBLICATIONS

Lee et al., "Assessing Medical Adherence by Pill Count and Electronic Monitoring in the African American Study of Kidney Disease and Hypertension (AASK) Pilot Study" (Year: 1996).*

(Continued)

*Primary Examiner* — Thien T Mai

(74) *Attorney, Agent, or Firm* — Alston & Bird LLP

(57) ABSTRACT

A pill counting device includes a step feeder having moveable slats interleaved with fixed slats. The movable slats are vertically offset from one another and are configured to move vertically between top platforms of adjacent fixed slats to carry pills vertically up the step feeder. A top movable slat orients a subset of the plurality of pills into a row of pills to be fed into a count chamber. A camera configured to capture an image of a pill of the individual pills as it falls through the count chamber. The device further includes a control system configured to control movement of the movable slats and to control capturing of images by the camera. The control system is further configured to calculate a characteristic of the pill from the image, and to increment a pill counter in response to the characteristic of the pill meeting predefined criteria.

30 Claims, 16 Drawing Sheets

(56) References Cited

U.S. PATENT DOCUMENTS 3,998,356 A 12/1976 Christensen
4,066,173 A 1/1978 Adams et al.
4,094,129 A 6/1978 List
4,267,942 A 5/1981 Wick et al.
4,319,700 A 3/1982 Celender et al.
4,396,828 A 8/1983 Dino et al.
4,546,901 A 10/1985 Buttarazzi
4,573,606 A 3/1986 Lewis et al.
4,597,091 A 6/1986 Blake
4,655,026 A 4/1987 Wigoda
4,664,289 A 5/1987 Shimizu et al.
4,674,651 A 6/1987 Scidmore et al.
4,685,271 A 8/1987 Ringer et al.
4,693,057 A 9/1987 Rittinger et al.
4,744,492 A 5/1988 Hackmann et al.
4,747,514 A 5/1988 Stone
4,767,023 A 8/1988 Hackmann et al.
4,785,969 A 11/1988 Mclaughlin
4,790,118 A 12/1988 Chilcoate
4,798,309 A 1/1989 Stone et al.
4,811,764 A 3/1989 Mclaughlin
4,847,764 A 7/1989 Halvorson et al.
4,872,591 A 10/1989 Konopka
4,903,861 A 2/1990 Yuyama
4,911,327 A 3/1990 Shepherd et al.
4,953,745 A 9/1990 Rowlett
4,980,292 A 12/1990 Elbert et al.
5,018,644 A 5/1991 Hackmann et al.
5,044,516 A 9/1991 Hoar
5,047,948 A 9/1991 Turner
5,097,982 A 3/1992 Kedem et al.
5,152,422 A 10/1992 Springer
5,176,285 A 1/1993 Shaw
5,197,632 A 3/1993 Kaufman et al.
5,221,024 A 6/1993 Campbell
5,238,124 A 8/1993 Cane et al.
5,323,929 A 6/1994 Marlar
5,392,952 A 2/1995 Bowden
5,431,299 A 7/1995 Brewer et al.
5,439,036 A 8/1995 Kraemer
5,441,165 A 8/1995 Kemp et al.
5,450,710 A 9/1995 Jensen et al.
5,522,525 A 6/1996 Mclaughlin et al.
5,562,232 A 10/1996 Pearson
5,564,593 A 10/1996 East
5,582,323 A 12/1996 Kurtenbach
5,587,572 A 12/1996 Kirby
5,609,268 A 3/1997 Shaw
5,630,347 A 5/1997 Elvio
5,638,417 A 6/1997 Boyer et al.
5,671,262 A 9/1997 Boyer et al.
5,709,063 A 1/1998 Yuyama et al.
5,720,154 A 2/1998 Lasher et al.
5,774,518 A 6/1998 Kirby
5,810,061 A 9/1998 Yuyama
5,810,198 A 9/1998 Townsend et al.
6,085,938 A 7/2000 Coughlin
6,142,337 A 11/2000 Schreckenberg et al.
6,145,700 A 11/2000 Takahashi et al.
6,161,721 A 12/2000 Kudera et al.
6,253,953 B1 7/2001 Ishizuka
6,286,714 B1 9/2001 Pearson et al.
6,349,848 B1 2/2002 Uema
6,370,215 B1 4/2002 Pinto et al.
6,471,090 B1 10/2002 Inamura et al.
6,497,339 B1 12/2002 Geltser et al.
6,554,157 B2 4/2003 Geltser et al.
6,561,377 B1 5/2003 Pearson et al.
6,578,733 B2 6/2003 Geltser et al.
6,659,304 B2 12/2003 Geltser et al.
6,684,914 B2 2/2004 Gershman et al.
6,732,884 B2 5/2004 Topliffe et al.
6,899,144 B1 5/2005 Geltser et al.
6,899,148 B1 5/2005 Geltser et al.
6,974,050 B2 12/2005 Williams et al.
6,997,341 B2 2/2006 Pearson et al.
7,004,353 B2 2/2006 Yamamoto et al.
7,021,492 B2 4/2006 Priebe et al.
7,102,741 B2 9/2006 Ackley et al.
7,124,791 B2 10/2006 Geltser et al.
7,219,703 B2 5/2007 Geltser et al.
7,228,198 B2 6/2007 Vollm et al.
7,263,411 B2 8/2007 Shows et al.
7,269,476 B2 9/2007 Ratnakar
7,303,094 B2 12/2007 Hutchinson et al.
7,383,862 B2 6/2008 Geltser et al.
7,392,640 B2 7/2008 Vasquali
7,395,841 B2 7/2008 Geltser et al.
7,506,780 B2 3/2009 Hutchinson et al.
7,571,023 B2 8/2009 Mitchell et al.
7,624,894 B2 12/2009 Gerold
7,631,670 B2 12/2009 Geltser et al.
7,753,229 B2 7/2010 Hutchinson et al.
7,789,267 B2 9/2010 Hutchinson et al.
7,805,216 B2 9/2010 Shows et al.
7,832,591 B2 11/2010 Karwacki et al.
7,853,355 B1 12/2010 Willemse et al.
7,885,725 B2 2/2011 Dunn
7,886,506 B2 2/2011 Knoth et al.
7,896,195 B2 3/2011 Limback et al.
7,918,068 B2 4/2011 Kumano
7,930,064 B2 4/2011 Popovich et al.
7,949,427 B2 5/2011 Michelli et al.
8,020,724 B2 9/2011 Remis et al.
8,060,246 B2 11/2011 Berg
8,065,035 B2 11/2011 Ross et al.
8,099,929 B2 1/2012 Kirby et al.
8,121,392 B2 2/2012 Popovich et al.
8,141,330 B2 3/2012 Henkel
8,146,331 B2 4/2012 Soloman
8,213,014 B1 7/2012 Willemse
8,220,657 B2 7/2012 Cicognani
8,234,838 B2 8/2012 Yasunaga et al.
8,256,187 B2 9/2012 Yuyama et al.
8,271,128 B1 9/2012 Schultz
8,386,073 B2 2/2013 Kim
8,386,275 B2 2/2013 Chambers
8,392,020 B2 3/2013 Terzini
8,393,495 B2 3/2013 Kim
8,424,274 B2 4/2013 Aylward et al.
8,467,899 B2 6/2013 Karwacki et al.
8,490,369 B2 7/2013 Foucher et al.
8,499,534 B2 8/2013 Gosse et al.
8,521,326 B1 8/2013 Holtje
8,537,004 B2 9/2013 Ross
8,584,715 B2 11/2013 Stoeckel et al.
8,601,776 B2 12/2013 Henkel
8,622,196 B1 1/2014 Lapointe
8,682,047 B2 3/2014 Lang et al.
8,700,208 B2 4/2014 Kim
8,769,915 B2 7/2014 Kobayashi et al.
8,770,413 B2 7/2014 Ackley et al.
8,774,964 B2 7/2014 Shows et al.
8,782,999 B2 7/2014 Kondo et al.
8,794,483 B2 8/2014 Czarnek
8,813,997 B2 8/2014 Karwacki et al.
8,833,602 B1 9/2014 Balasubramanian et al.
8,833,603 B1 9/2014 Balasubramanian et al.
8,849,450 B1 9/2014 Balasubramanian et al.
8,855,811 B1 10/2014 Schultz
8,862,266 B2 10/2014 Van Ooyen et al.
8,887,603 B2 11/2014 Yuyama et al.
8,943,779 B2 2/2015 Amano et al.
8,967,426 B2 3/2015 Koike et al.
8,972,049 B2 3/2015 Tidhar et al.
8,972,050 B2 3/2015 Johnson et al.
8,991,138 B2 3/2015 Yuyama et al.
8,997,441 B2 4/2015 Yuyama et al.
9,037,291 B2 5/2015 Terzini
9,089,661 B2 7/2015 Stuart et al.
9,155,681 B2 10/2015 Yuyama et al.
9,218,458 B2 12/2015 Baarman et al.
9,233,789 B2 1/2016 Koike et al.
9,241,877 B2 1/2016 Burton et al.

(56) References Cited

U.S. PATENT DOCUMENTS

| | | | |
|---|---|---|---|
| 9,251,493 B2 | 2/2016 | Jacobs et al. | |
| 9,296,545 B2 | 3/2016 | Daniels et al. | |
| 9,299,212 B2 | 3/2016 | Amano et al. | |
| 9,372,961 B1 | 6/2016 | Guthrie et al. | |
| 9,387,153 B1 | 7/2016 | Mazur | |
| 9,415,178 B2 | 8/2016 | Bacon | |
| 9,428,288 B2 | 8/2016 | Shigeyama et al. | |
| 9,434,528 B2 | 9/2016 | Ashbaugh | |
| 9,460,581 B2 | 10/2016 | Niinistö et al. | |
| 9,475,633 B2 | 10/2016 | Hoover et al. | |
| 9,501,626 B2 | 11/2016 | Zhang et al. | |
| 9,506,903 B2 | 11/2016 | Guthrie et al. | |
| 9,569,592 B2 | 2/2017 | Heffron | |
| 9,582,956 B2 | 2/2017 | Yuyama et al. | |
| 9,611,084 B2 | 4/2017 | Koike et al. | |
| 9,682,016 B1 | 6/2017 | Balasubramanian et al. | |
| 9,697,335 B2 | 7/2017 | Joplin | |
| 9,770,389 B2 | 9/2017 | Koike et al. | |
| 9,776,755 B2 | 10/2017 | Kondo et al. | |
| 9,779,217 B2 | 10/2017 | Jordan et al. | |
| 9,886,555 B2 | 2/2018 | Mikhaeil | |
| 9,904,992 B2 | 2/2018 | Takamori | |
| 9,913,778 B2 | 3/2018 | Dvorak et al. | |
| 9,914,554 B2 | 3/2018 | Lokkers et al. | |
| RE46,835 E | 5/2018 | Chambers | |
| 9,956,145 B2 | 5/2018 | Thompson et al. | |
| 9,962,317 B2 | 5/2018 | Koike et al. | |
| 9,994,347 B2 | 6/2018 | Yuyama et al. | |
| 10,007,993 B2 | 6/2018 | Takahashi | |
| 10,028,889 B2 | 7/2018 | Despa et al. | |
| 10,045,914 B2 | 8/2018 | Yuyama et al. | |
| 10,065,788 B2 | 9/2018 | Fagen et al. | |
| 10,073,955 B2 | 9/2018 | Ervin | |
| 10,089,444 B2 | 10/2018 | Weber | |
| 10,099,806 B2 | 10/2018 | Koike et al. | |
| 10,099,809 B2 | 10/2018 | Van Wijngaarden | |
| 10,176,663 B2 | 1/2019 | King et al. | |
| 10,198,556 B2 | 2/2019 | Herman et al. | |
| 10,227,153 B2 | 3/2019 | Yoshina et al. | |
| 10,229,321 B2 | 3/2019 | Gershtein et al. | |
| 10,232,967 B2 | 3/2019 | Baroncini | |
| 10,238,578 B2 | 3/2019 | Chessa et al. | |
| 10,252,826 B2 | 4/2019 | Lokkers et al. | |
| 10,275,976 B2 | 4/2019 | Koenigsknecht et al. | |
| 10,314,767 B2 | 6/2019 | Hasegawa | |
| 10,325,074 B2 | 6/2019 | Braunstein | |
| 10,325,333 B2 | 6/2019 | Eller et al. | |
| 10,346,590 B2 | 7/2019 | Coughlin et al. | |
| 10,350,142 B1 | 7/2019 | Fiedler | |
| 10,360,751 B2 | 7/2019 | Berg et al. | |
| 10,380,824 B2 | 8/2019 | Hellenbrand et al. | |
| 10,387,620 B1 | 8/2019 | Wollschleger | |
| 10,387,622 B2 | 8/2019 | Hartlaub et al. | |
| 10,388,102 B2 | 8/2019 | Wilson et al. | |
| 10,391,036 B2 | 8/2019 | Koike et al. | |
| 10,392,140 B2 | 8/2019 | Siegel et al. | |
| 10,399,764 B2 | 9/2019 | Jacobs et al. | |
| 10,409,959 B2 | 9/2019 | Takahama et al. | |
| 10,420,707 B2 | 9/2019 | Lewis | |
| 10,441,509 B2 | 10/2019 | Rouse et al. | |
| 10,441,510 B2 | 10/2019 | Omura | |
| 10,449,120 B2 | 10/2019 | Govindasamy et al. | |
| 10,456,332 B2 | 10/2019 | Paz | |
| 10,468,132 B2 | 11/2019 | Kamen et al. | |
| 10,486,889 B2 | 11/2019 | Omura | |
| 10,512,592 B1 | 12/2019 | Sandhu | |
| 10,532,840 B2 | 1/2020 | Schmidt-Ellinger et al. | |
| 10,537,496 B2 | 1/2020 | Geltser et al. | |
| 10,545,048 B2 | 1/2020 | Pilkington et al. | |
| 10,555,873 B2 | 2/2020 | Poirier et al. | |
| 10,568,813 B2 | 2/2020 | Jacobs et al. | |
| 10,577,186 B2 | 3/2020 | Bassani | |
| 10,583,979 B2 | 3/2020 | Schmidt-ellinger | |
| 10,589,883 B2 | 3/2020 | Van Wijngaarden | |
| 10,614,352 B1 | 4/2020 | Davis et al. | |
| 10,633,135 B2 | 4/2020 | Akdogan et al. | |
| 10,640,241 B2 | 5/2020 | Koike | |
| 10,646,405 B2 | 5/2020 | Ranalletta et al. | |
| 10,672,219 B2 | 6/2020 | Schmidt-ellinger | |
| 10,675,221 B2 | 6/2020 | Li et al. | |
| 10,675,223 B2 | 6/2020 | Wilson et al. | |
| 10,683,137 B2 | 6/2020 | Hawry | |
| 10,685,091 B1 | 6/2020 | Park et al. | |
| 10,703,517 B2 | 7/2020 | Fujii | |
| 10,713,540 B2 | 7/2020 | Zhang et al. | |
| 10,734,106 B2 | 8/2020 | Doherty | |
| 10,736,819 B1 | 8/2020 | Nowosielski et al. | |
| 10,762,614 B2 | 9/2020 | Yuyama et al. | |
| 10,772,803 B2 | 9/2020 | Omura | |
| 10,791,827 B2 | 10/2020 | Hoffman et al. | |
| 10,792,224 B2 | 10/2020 | Hancock et al. | |
| 10,792,226 B2 | 10/2020 | Rouse et al. | |
| 10,803,693 B2 | 10/2020 | Debarge | |
| 10,803,982 B2 | 10/2020 | Holmes et al. | |
| 11,147,741 B2 | 10/2021 | Brouard et al. | |
| 2003/0183642 A1 | 10/2003 | Kempker | |
| 2004/0011806 A1 | 1/2004 | Luciano et al. | |
| 2006/0266763 A1 | 11/2006 | Svabo | |
| 2007/0289660 A1* | 12/2007 | Aylward | B65B 57/18<br>141/18 |
| 2010/0076595 A1 | 3/2010 | Nguyen | |
| 2010/0139222 A1 | 6/2010 | Federle et al. | |
| 2010/0140287 A1 | 6/2010 | Richardson et al. | |
| 2010/0205002 A1 | 8/2010 | Chambers | |
| 2011/0301747 A1 | 12/2011 | Chambers | |
| 2014/0150376 A1 | 6/2014 | Milton | |
| 2014/0174026 A1 | 6/2014 | Iimori et al. | |
| 2014/0190986 A1 | 7/2014 | Kikuchi | |
| 2014/0303774 A1 | 10/2014 | Schwarzli et al. | |
| 2014/0361031 A1 | 12/2014 | Bonpain et al. | |
| 2015/0101291 A1 | 4/2015 | Ishiwatari et al. | |
| 2015/0196459 A1 | 7/2015 | Pearson et al. | |
| 2015/0224030 A1 | 8/2015 | Koike et al. | |
| 2016/0158108 A1 | 6/2016 | Gofer et al. | |
| 2017/0304153 A1 | 10/2017 | Williamson et al. | |
| 2017/0327255 A1 | 11/2017 | Kim | |
| 2018/0082757 A1 | 3/2018 | Chambers et al. | |
| 2018/0121867 A1 | 5/2018 | Stump et al. | |
| 2018/0194505 A1 | 7/2018 | Amano et al. | |
| 2018/0263853 A1* | 9/2018 | Yang | B65B 57/20 |
| 2018/0325778 A1 | 11/2018 | Wang | |
| 2019/0091106 A1 | 3/2019 | Kim | |
| 2019/0164281 A1 | 5/2019 | Lewis et al. | |
| 2019/0228852 A1* | 7/2019 | García | A61J 7/0084 |
| 2019/0328617 A1 | 10/2019 | Omura | |
| 2019/0337647 A1 | 11/2019 | Yokoyama et al. | |
| 2020/0035345 A1 | 1/2020 | Swarvar et al. | |
| 2020/0115088 A1 | 4/2020 | Fahey et al. | |
| 2020/0129379 A1 | 4/2020 | Fukada | |
| 2020/0170887 A1 | 6/2020 | Shibata | |
| 2020/0289375 A1 | 9/2020 | Sujith | |
| 2020/0399074 A1 | 12/2020 | Heim et al. | |
| 2021/0006704 A1* | 1/2021 | Shirahara | H04N 23/50 |
| 2021/0030626 A1 | 2/2021 | Medhal | |
| 2021/0052468 A1 | 2/2021 | Whittier et al. | |
| 2021/0086934 A1 | 3/2021 | Burkett et al. | |
| 2021/0322274 A1 | 10/2021 | Stevens | |

FOREIGN PATENT DOCUMENTS

| | | |
|---|---|---|
| WO | 2010053369 A2 | 5/2010 |
| WO | 2015050312 A1 | 4/2015 |
| WO | 2015076267 A1 | 5/2015 |
| WO | 2015121353 A1 | 8/2015 |
| WO | 2016166187 A1 | 10/2016 |
| WO | 2017002908 A1 | 1/2017 |
| WO | 2017002909 A1 | 1/2017 |
| WO | 2017002910 A1 | 1/2017 |
| WO | 2017002911 A1 | 1/2017 |
| WO | 2017002912 A1 | 1/2017 |
| WO | 2017002913 A1 | 1/2017 |
| WO | 2018012969 A1 | 1/2018 |
| WO | 2018021323 A1 | 2/2018 |
| WO | 2018078613 A1 | 5/2018 |

(56) References Cited

FOREIGN PATENT DOCUMENTS

| | | | |
|---|---|---|---|
| WO | 2018141497 | A1 | 8/2018 |
| WO | 2019104293 | A1 | 5/2019 |
| WO | 2019143820 | A1 | 7/2019 |
| WO | 2020011493 | A1 | 1/2020 |
| WO | 2020044933 | A1 | 3/2020 |
| WO | 2020079689 | A1 | 4/2020 |
| WO | 2020089469 | A1 | 5/2020 |
| WO | 2020104748 | A1 | 5/2020 |
| WO | 2020147171 | A1 | 7/2020 |
| WO | 2020162020 | A1 | 8/2020 |
| WO | 2020178706 | A1 | 9/2020 |
| WO | 2020206412 | A1 | 10/2020 |
| WO | 2021025225 | A1 | 2/2021 |
| WO | 2021040950 | A2 | 3/2021 |
| WO | 2023003883 | A2 | 1/2023 |

OTHER PUBLICATIONS

Rudd, "The natural history of medication compliance in a drug trial: Limitations of pill counts" (Year: 1989).*

Invitation to pay additional fees and, Where Applicable, Protest Fee issued in International Patent Application No. PCT/US2022/037602, dated Jan. 9, 2023, 10 pages.

International Search Report and Written Opinion issued in International Application No. PCT/US2022/037602, dated Mar. 30, 2023, 16 pages.

* cited by examiner

500

SYSTEM AND METHOD TO COUNT PILLS

RELATED APPLICATION

The present application claims priority to U.S. Provisional Patent Application Ser. No. 63/223,190 filed on Jul. 19, 2021, the subject matter of which is incorporated herein in its entirety by reference.

BACKGROUND

Accurately singulating small objects from a bulk supply is a difficult task, with the objects being different sizes, shapes, weights, etc. In some applications, such as counting accuracy and precision is of upmost importance, such as in counting of pills. Some conventional pill singulating devices rely on cassettes, spinning drums, and/or vacuum driven systems to singulate pills and photoelectric sensors to count the pills. However, these systems can be susceptible to reliability issues and inaccurate counting due to complex mechanical operation and/or sensor limitations.

DETAILED DESCRIPTION

Figure 1A:
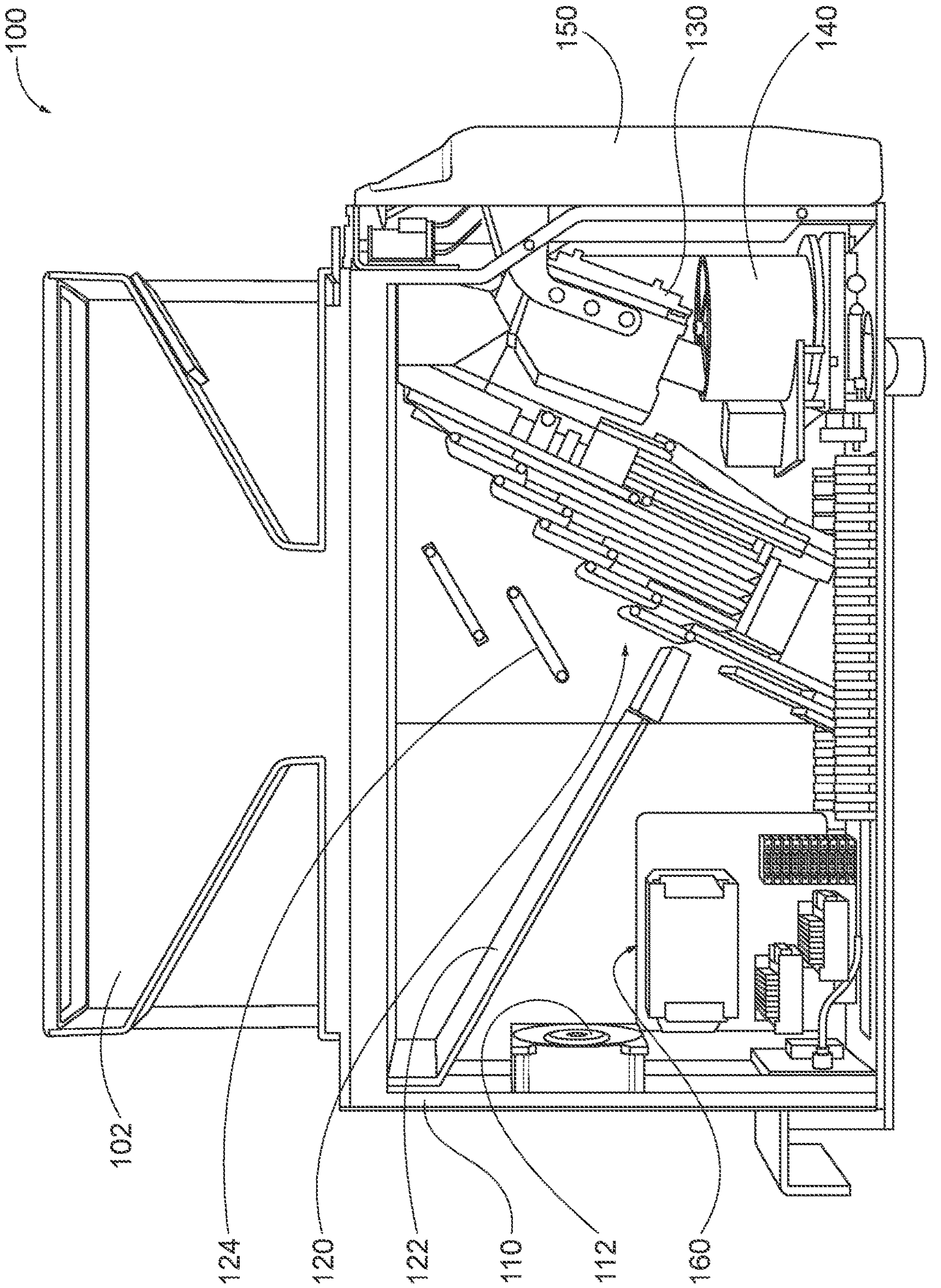
FIGS. 1A and 1B depict an example pill counting device in accordance with embodiments of the disclosure.

Certain details are set forth below to provide a sufficient understanding of embodiments of the disclosure. It will be clear to one skilled in the art, however, that embodiments of the disclosure may be practiced without various aspects of these particular details. In some instances, circuits, control signals, timing protocols, computer system components, and software operations that would be understood to a person of skill in the art have not been shown in detail to avoid unnecessarily obscuring the described embodiments of the disclosure.

This disclosure describes embodiments of a pill counting device. While the device described in this application is described in the context of counting pills, the device can be applied to the counting of any discrete objects, including food items, hardware, vitamins, etc. The pill counting device may include a loading hopper connected to a housing that includes a step feeder, a count chamber, and an indexer unit. In some examples, the loading hopper may provide pills to be counted into the feed hopper. The step feeder may receive and singulate pills from the load hopper. The singlulated pills may drop though the count chamber into the indexer unit. The count chamber may include one or more image capturing devices that take images of the pills as they pass through the count chamber. The images may be analyzed to determine an area of each pill or other object that falls through the count chamber. If the calculated areas is greater than a threshold, then a pill count value may be incremented.

The indexer may receive and retain a vial (e.g., a pill bottle) under a compartment of the indexer. When the pill bottle is in place, the indexer may open a bottom gate to allow pills to fall into the pill bottle. In some examples, counted pills may pass directly through count chamber and the indexer into the pill bottle. In other examples, a predetermined count of pills may be temporarily stored in the compartment of the indexer, and a gate of the indexer may open to pass the temporarily-stored predetermined count of pills from the compartment into the pill bottle when the pill bottle is in place to receive the pills.

The pill counting device may include a programmable logic controller or other controller to control movement of the step feeder. In some examples, the pill counting device may include a memory configured to store executable instructions, and a processing unit (e.g., a microcontroller, a central processor unit, or other type of processing unit) configured to execute the executable instructions to control operation of various components of the pill counting device, including controlling the cameras, determining an area of objects that fall through the count chamber, analyzing images to determine whether to increment a pill count, detecting problems with the pill counting device, driving a user interface, etc.

The loading hopper may be configured to receive a bulk quantity of pills to be distributed in prescribed quantities to individual vials (e.g., bottles). The loading hopper may gravity-feed pills into the feed hopper via one or more openings or apertures in the housing. In some examples, the one or more openings or apertures may include a gate mechanism that can be opened or closed to control provision of the pills from the loading hopper to the step feeder.

The step feeder may include a sloped member configured to direct the pills from the loading hopper toward the step movable step mechanism. In some examples, the step feeder may further include adjustable baffles configured to further control the flow of pills toward the movable step mechanism. The movable step mechanism may include a series of moveable slats that are situated in a mostly-vertical (e.g., angled at less than 45 degrees from a vertical reference) orientation. The top platform of each of the set of movable slats may be vertically offset from one another such that they form a step or stair-like arrangement, and work together to move pills from a lower position to an upper position, where they are fed into a count housing. The set of slats may be interleaved with a set of fixed slats, such that each of the movable slats are slotted between respective upper and lower fixed slats. The top platform of each slat of the set of movable slats has a range of motion from even with (or slightly below) a top platform of the respective lower fixed slat to even with (or slightly above) a top platform of the upper fixed slat. The top platform of each of the set of slats may have a width and a depth to accommodate a single row of multiple pills. The top platform of each of the fixed slats may provide a ledge to hold a row of pills while until the next movable slat is lowered to receive the next set of pills. In some examples, the top slat of the series of movable slats may be configured to be selectively changed based on a size of pill to be counted. The top slat in the series of slats may interface with an angled member to allow the pills to fall from the slat into the count chamber in a cascading manner (e.g., the pills fall at different times such that they generally fall through the count chamber one at a time).

The count chamber may include at least one camera configured to capture images of objects falling through a tube. The images may be provided to a processor unit to determine one or more characteristics of an object as it falls through the tube. If the one or more determined characteristics match predefined criteria, the processor unit may increment a counter. In some examples, the predetermined characteristic may include an area, such that if the captured object has a total area that is equal to and/or greater than a predetermined threshold area, then the processor unit may increment a counter. Other characteristics may include length, width, depth, color, shape, opaqueness, etc., or any combination thereof. In some examples, the predefined criteria may be set via a user interface. In some examples, the tube may be removable for changing sizes or cleaning.

The indexer unit may be configured to receive pills that have fallen through the count chamber and to route them to a vial (e.g., bottle, container, etc.) for holding pills. In some examples, the indexer unit may include a retainer configured to temporarily hold pills that have fallen through the count chamber. In some examples, the retainer may be circular, and may include vertical dividers to form multiple compartments in the retainer. The indexer unit may further include a mechanism to retain the vial and a release mechanism to release held pills into the retained vial. In some examples, the release mechanism may include an actuator that selectively moves a cover or door to expose an opening in the floor that allows pills to fall through into the retained vial. In some examples, the vial may be retained directly below the count chamber. In some modes of operation, the actuator may hold the door open such that the pills fall directly through from the count chamber and into the vial without being temporarily retained. In some examples, the processor unit may keep track of a number of pills held in each compartment, and may control the retainer to rotate to a position to top off the retained vial to reach the prescribed number of pills.

Figure 1B:
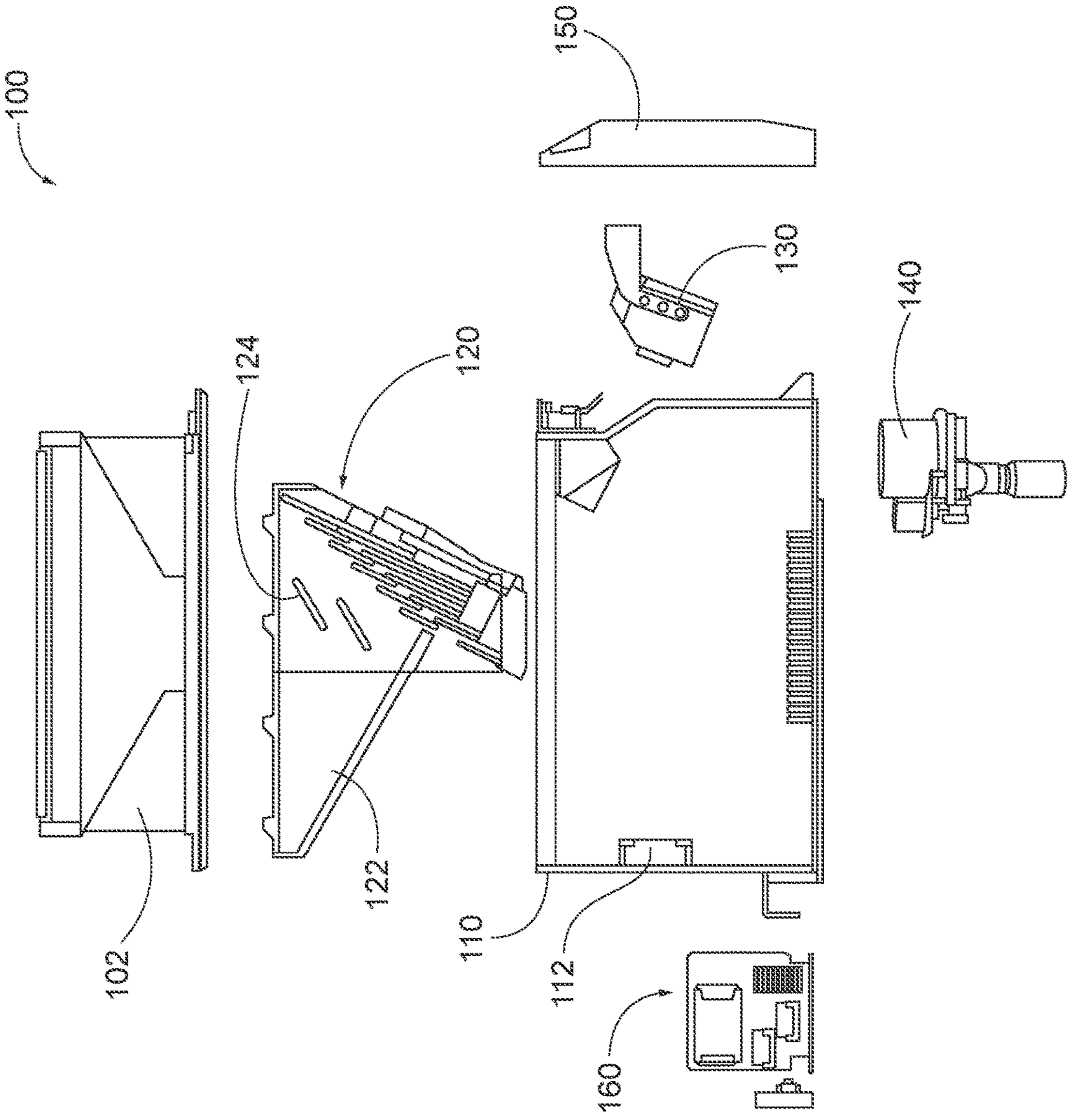

FIGS. 1A and 1B depict an example pill counting device (device) 100 in accordance with embodiments of the disclosure. FIG. 1A depicts the device 100 assembled, and FIG. 1B depicts the device 100 with various components isolated. The device 100 includes a loading hopper 102 connected to a housing 110. The housing 110 includes a 112 for cooling, a step feeder 120, a count chamber 130, an indexer unit 140, a display 150, and a control system 160. In some examples, the loading hopper 102 may provide pills to be counted into the step feeder 120.

The step feeder 120 may receive and singulate pills from the load hopper 102. The step feeder may include a sloped portion 122 configured to cause pills to flow toward the step mechanism and/or configurable baffles 124 configured to control a flow of pills to the step mechanism.

The singlulated pills may drop though the count chamber 130 into the indexer unit 140. The count chamber 130 may include one or more image capturing devices that take images of the pills as they pass through the count chamber 130. The images may be analyzed to determine an area of each pill or other object that falls through the count chamber 130. If the calculated areas is greater than a threshold, then a pill count value may be incremented. For example, a frame may be applied via software to the pills in the image, and if a pill is larger than the frame it is counted as a pill, whereas in one embodiment pill fragments that are smaller than the frame would not be counted. In other embodiments, various frame sizes could be applied, where objects that are larger than only the smaller frames but not the larger frames are added together, so that pill fragments could be added together to equal an entire pill.

The indexer unit 140 may receive and retain a vial (e.g., pill bottle) under the indexer unit 140. When the pill bottle is in place, the indexer unit 140 may open a bottom gate to allow pills to fall into the pill bottle. In some examples, a predetermined count of pills may be temporarily stored in a compartment of the pill retainer of the indexer unit 140, and the bottom gate of the indexer unit 140 may open to pass the temporarily-stored predetermined count of pills from the compartment into the pill bottle when the pill bottle is in place to receive the pills. In some examples, the indexer unit 140 may be selectively removable to facilitate direct filling of a pill bottle with not temporary storage. For example, counted pills may pass directly through count chamber 130 and a tube (not shown) installed in place of the indexer unit 140 into the pill bottle when the indexer unit 140 is removed. In some examples, the tube may be an extended version of the tube in the count chamber 130.

The control system 160 may control output devices, such as switches, solenoids, actuators, etc. The control system 160 may further monitor various input devices, such as cameras, level indicators, position indicators, etc. In some examples, the device 100 may include a memory configured to store executable instructions, and a processing unit (e.g., a microcontroller, a central processor unit, or other type of processing unit) 160 configured to execute the executable instructions to control operation of various components of the pill counting device, including controlling the cameras, determining an area of objects that fall through the count chamber, analyzing images to determine whether to increment a pill count, detecting problems with the pill counting device, driving a user interface, etc. In some examples, the control system 160 includes a programmable logic controller (PLC) configured to be programmed to control or perform methods or operations described herein. While the control system 160 is depicted in FIGS. 1A and 1B as being co-located in a single location, certain portions of the control system 160 may be located elsewhere within the device 100.

In some examples, the device 100 may include the display 150 with a user interface configured to provide operational information, provide alerts or warnings regarding problems with the pill counting device, receive user input to set or change one or more configurable parameters (e.g., step feeder speed, pill area, camera frame rates, target pill count information, etc.). In some examples, the device 100 may include a communication interface (e.g., wired or wireless, direct or network-based) configured to provide operational information, receive target pill counts, receive information to set or adjust configurable parameters, etc., to a remote device. In some examples, some portions of the control system 160 corresponding to the display may be positioned proximate the display 150. For example, as part of the control system 160, the display 150 may include a system-on-module (SOM) (e.g., having a memory and/or one or more processor units for storing and executing instructions to perform various operations described herein. In other examples, the SOM may be separate from the display 150, but may mounted behind the display 150. In some examples, the SOM may control operations of the camera, including the frame rate, as well as may execute an algorithm to decipher targets that call through the count chamber 130 for counting.

The loading hopper 102 may be configured to receive a bulk quantity of pills to be distributed in prescribed quantities to individual vials (e.g., bottles). The loading hopper 102 may gravity-feed pills into the stem mechanism 120 via one or more openings or apertures in the housing 110. In some examples, the one or more openings or apertures may include a gate mechanism that can be opened or closed to control provision of the pills from the loading hopper 102 to the step feeder 120.

Figure 2:
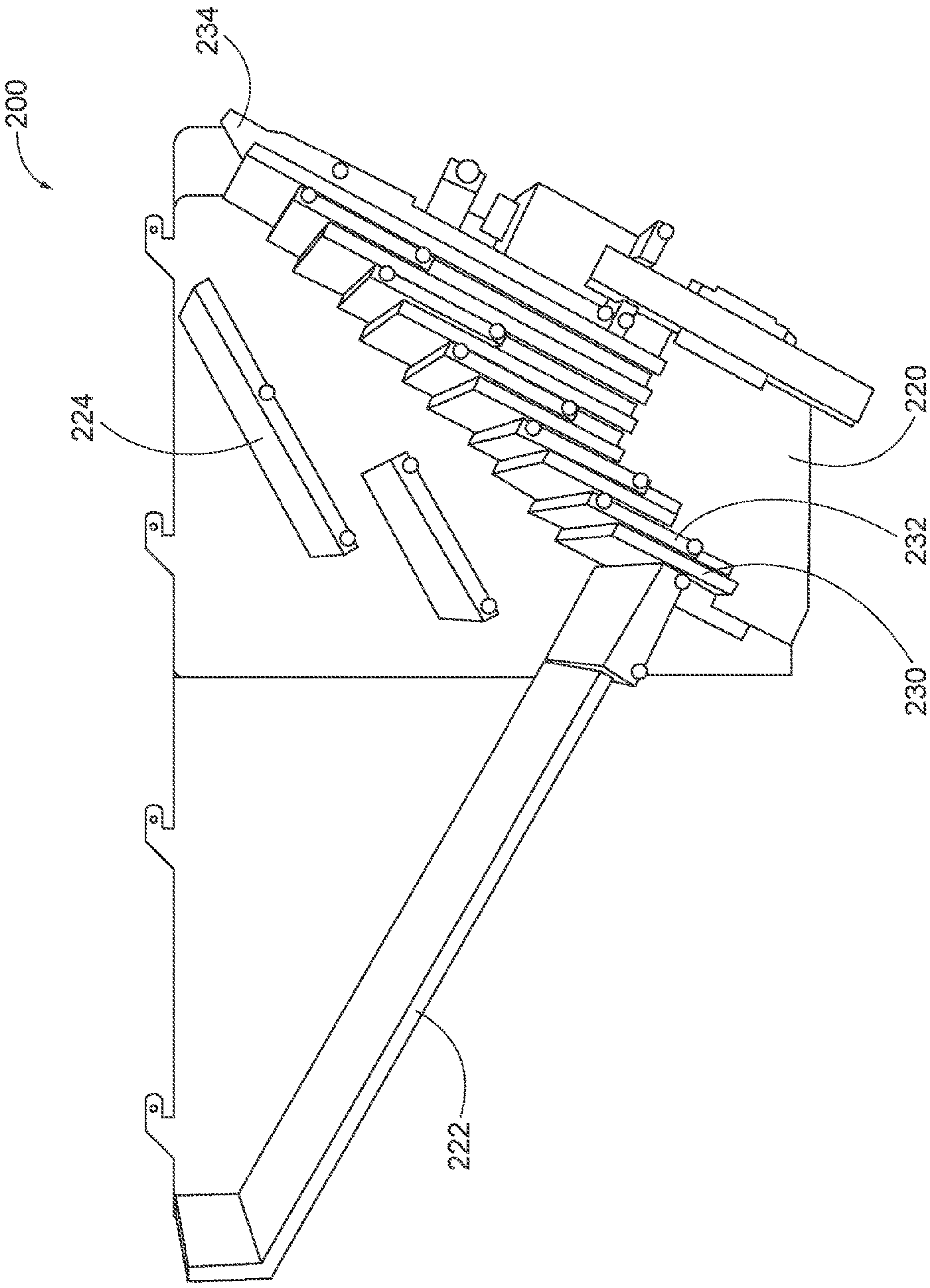
FIG. 2 depicts a step feeder 200 accordance with embodiments of the disclosure.

FIG. 2 depicts a step feeder 200 accordance with embodiments of the disclosure. The step feeder 200 may include a sloped member 222 configured to direct the pills from the loading hopper toward a movable step mechanism 220. In some examples, the step feeder 200 may further include adjustable baffles 224 configured to further control the flow of pills toward the movable step mechanism 220. The step feeder 120 of FIGS. 1A and 1B may implement the step feeder 200 in some examples.

The movable step mechanism 220 may include a set of moveable slats 230 that are situated in a mostly-vertical (e.g., angled at less than 45 degrees from a vertical reference) orientation. The top platform of each of the set of movable slats 230 may be vertically offset from one another such that they form a step or stair-like arrangement, and work together to move pills from a lower position to an upper position, where they are fed into the count chamber. The set of movable slats 230 may be interleaved with a set of fixed slats 232, such that each of the movable slats 230 are slotted between respective upper and lower fixed slats 232. The top platform of each slat of the set of movable slats 230 has a range of motion from even with (or slightly below) a top platform of the respective lower fixed slat 232 to even with (or slightly above) a top platform of the upper fixed slat 232. The top platform of each of the set of movable slats 230 may have a width and a depth to accommodate a single row of multiple pills. The top platform of each of the fixed slats 232 may provide a ledge to hold a row of pills while until the next movable slat 230 is lowered to receive the next set of pills. In some examples, the top slat 234 of the series of movable slats 230 may be configured to be selectively changed, either via the use of an expandable slat (physically or electronically or via the replacement of one slat with another) based on a size of pill to be counted. The top slat 234 in the set of movable slats 230 may interface with an angled member to allow the pills to fall from the top slat 234 into the count chamber in a cascading manner (e.g., the pills fall at different times such that they generally fall through the count chamber one at a time).

Figure 3A:
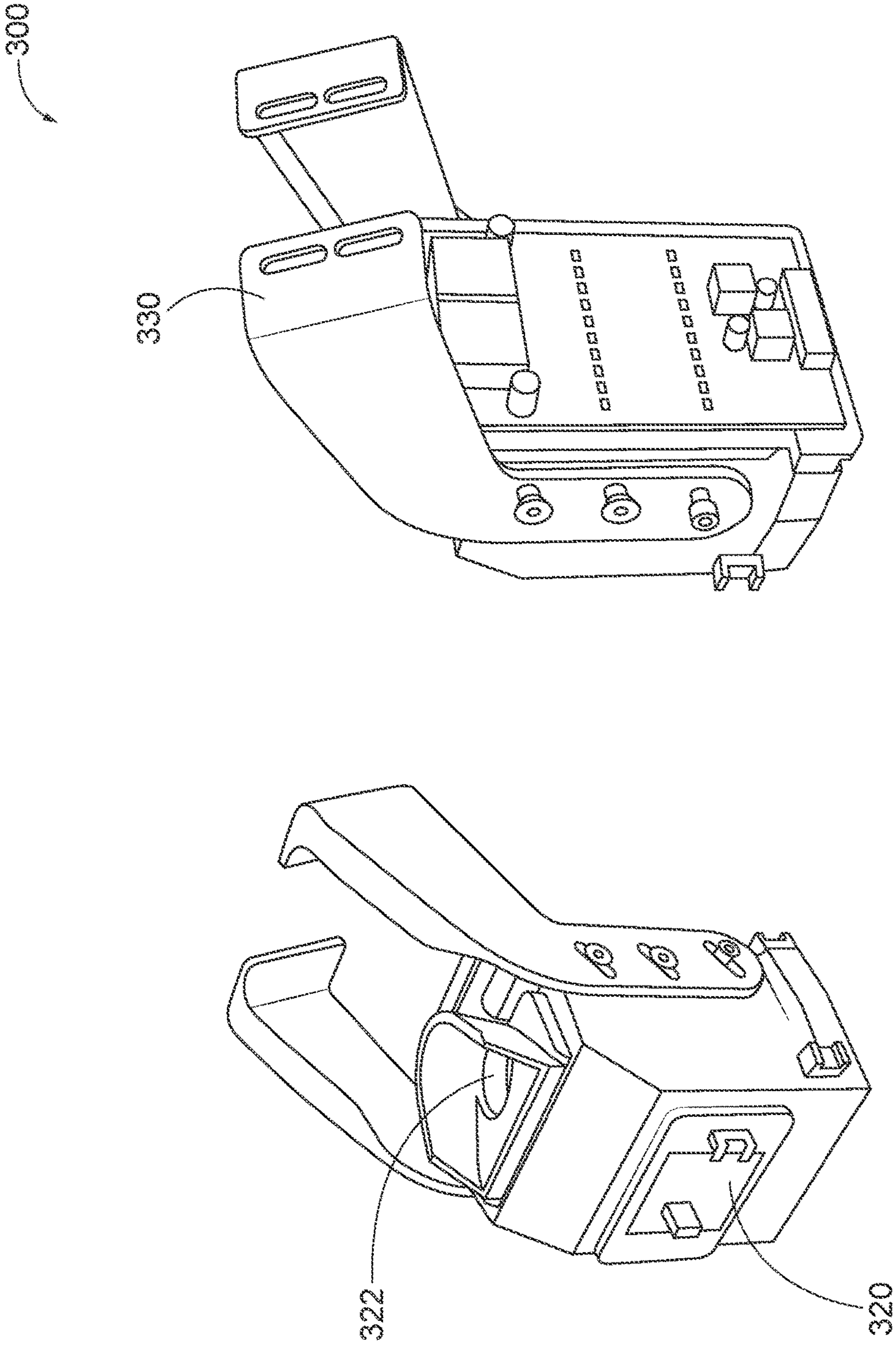
FIGS. 3A to 3C depict various views of a count chamber accordance with embodiments of the disclosure.
Figure 3B:
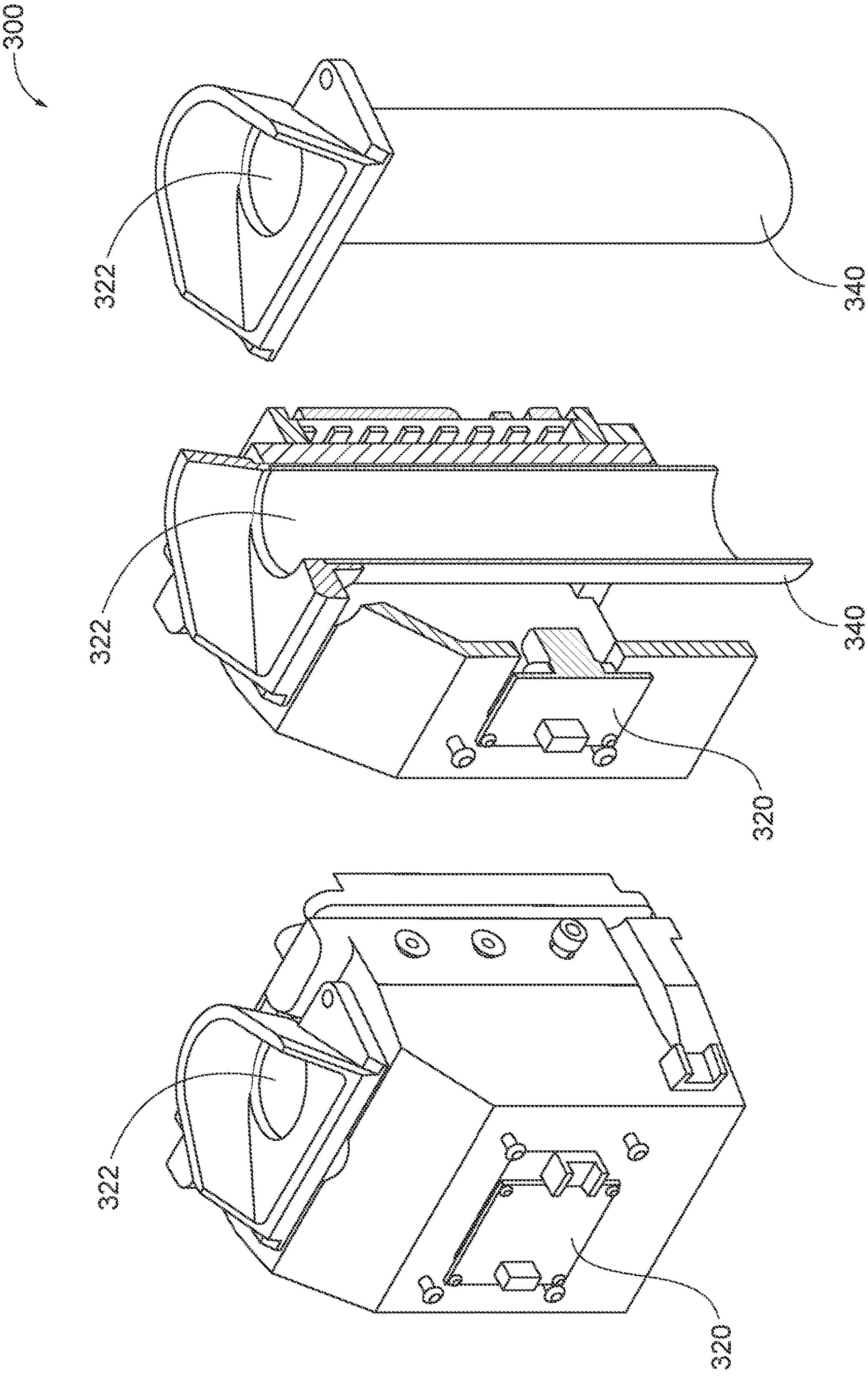
Figure 3C:
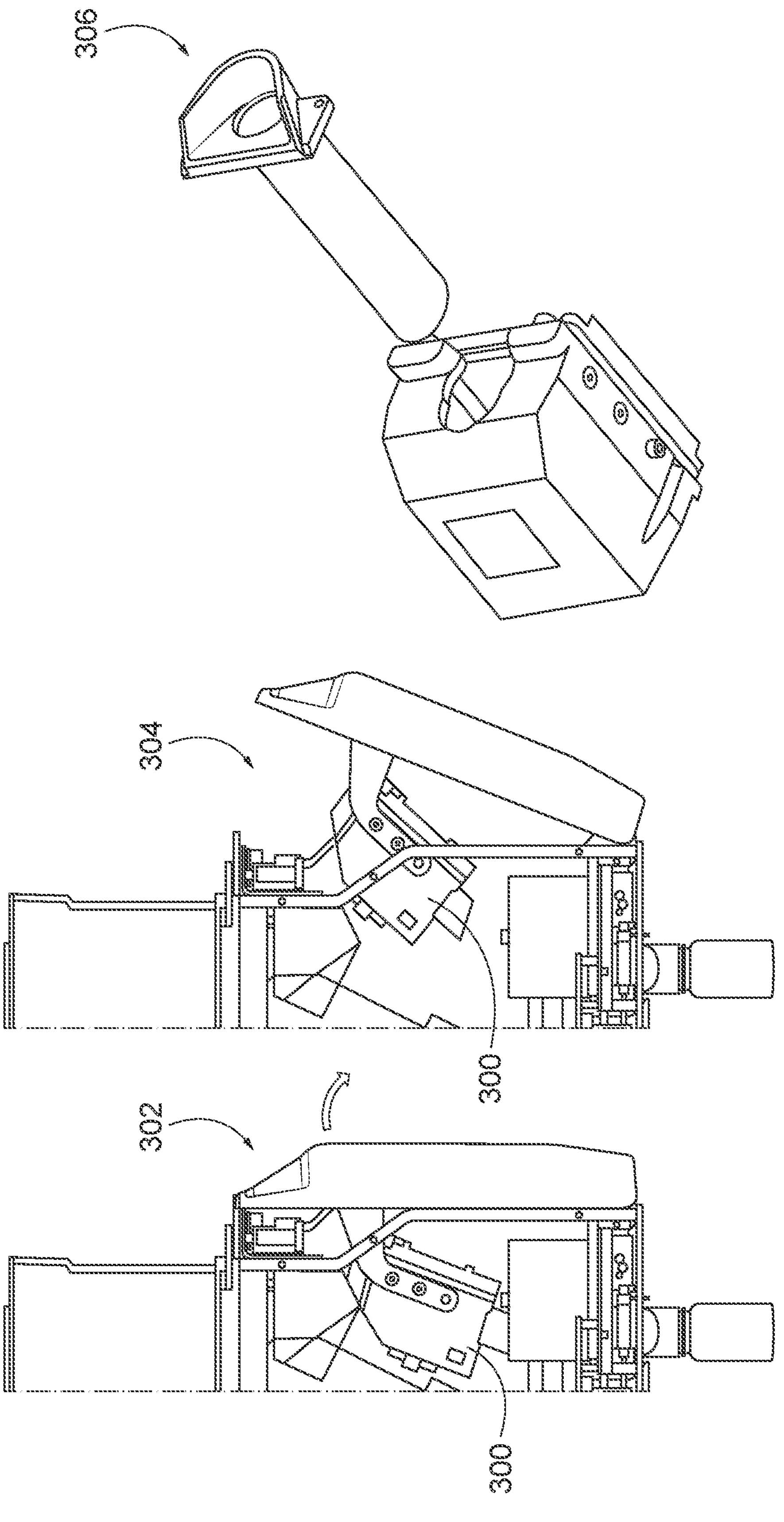

FIGS. 3A to 3C depict various views of a count chamber 300 accordance with embodiments of the disclosure. The count chamber 300 may include at least one camera (or other image capturing device) 320 configured to capture images of objects falling through an opening 322 in a tube 340. In some examples, the count chamber 300 may include a backlight or other light source (such as a direct light) to illuminate the pills as they fall through the tube 340. The count chamber 300 may include mounting brackets 330 to mount the count chamber 300 in a pill counting device.

The count chamber 130 of FIGS. 1A and 1B may implement the count chamber 300 in some examples.

The images may be provided to a processor unit to determine one or more characteristics of an object as it falls through the tube 340. If the one or more determined characteristics match predefined criteria, the processor unit may increment a counter. In some examples, the predetermined characteristic may include an area, such that if the captured object has a total area that is equal to and/or greater than a predetermined threshold area, then the processor unit may increment a counter. Other characteristics may include length, width, depth, color, shape, opaqueness, etc., or any combination thereof. In some examples, the predefined criteria may be set via a user interface. In some examples, the tube may be removable for changing sizes or cleaning. In some examples, the tube 340 may be transparent. In some examples, the tube 340 may be selectively removed for cleaning or replacement. The mounting brackets 330 may be arranged to allow the count chamber 300 to be removed from a pill counter, such as for maintenance. For example, as shown steps 302, 304, and 306 of FIG. 3C, the mounting brackets 330 may mount to a front panel of the pill counting device, and as the front panel is removed, the count chamber 300 may also be removed from the pill counting device.

Figure 4A:
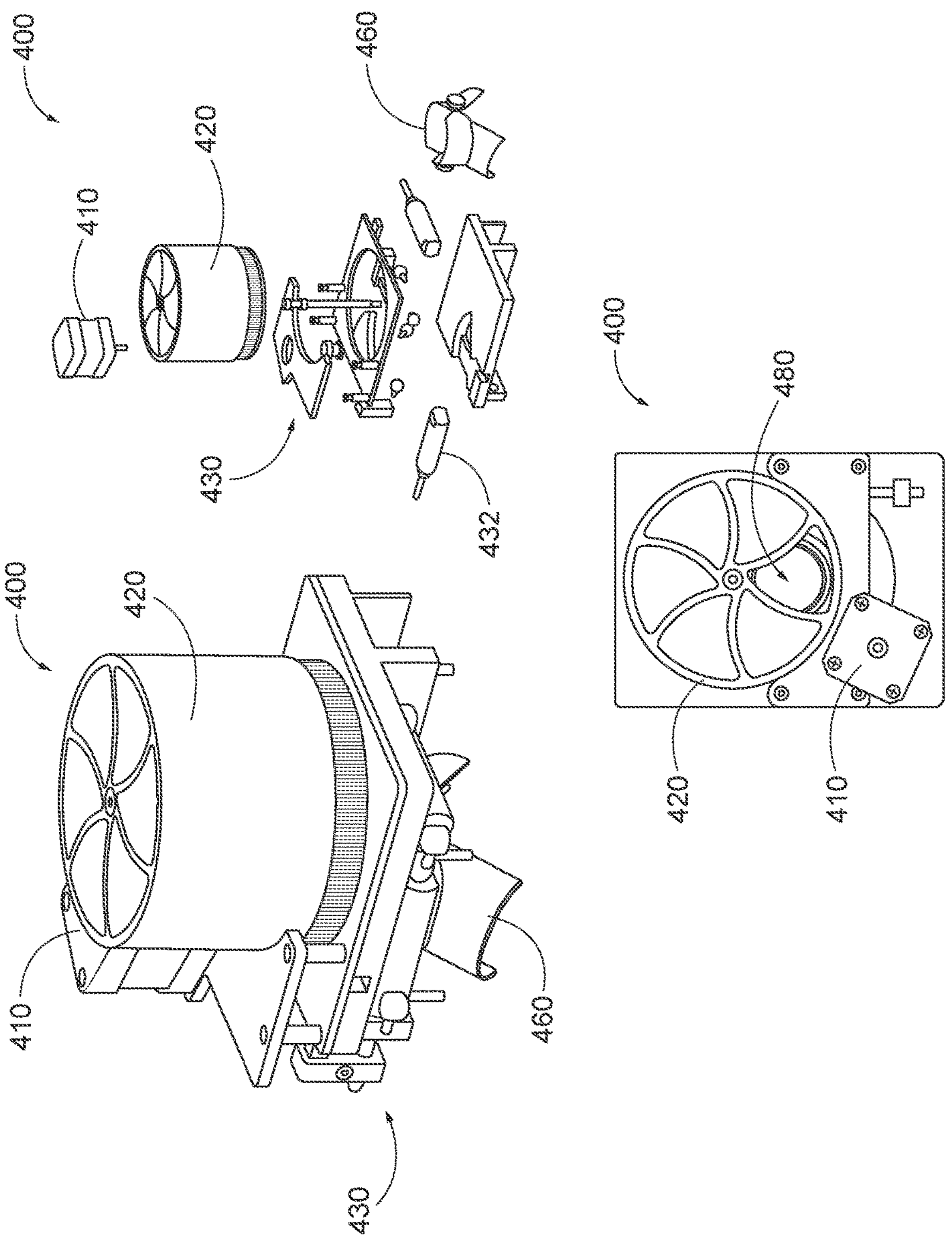
FIGS. 4A and 4B depict various views of an indexer unit in accordance with embodiments of the disclosure.
Figure 4B:
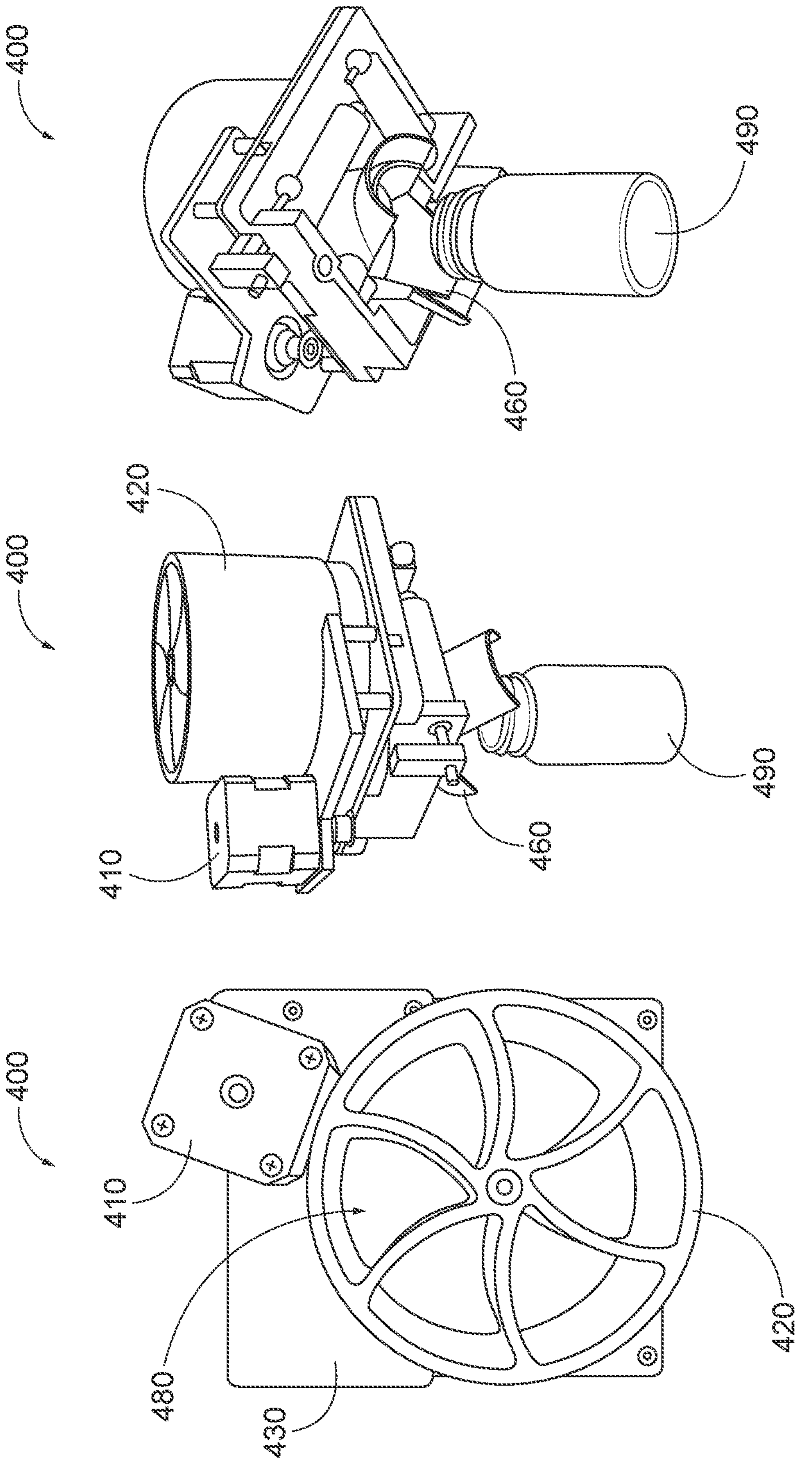

FIGS. 4A and 4B depict various views of an indexer unit 400 in accordance with embodiments of the disclosure. The indexer unit 400 may include a motor 410, a pill retainer 420, a release mechanism 430, and a vial retainer 460. The indexer unit 140 of FIGS. 1A and 1B may implement the indexer unit 400 in some examples.

The indexer unit 400 may be configured to receive pills that have fallen through the count chamber and to route them to a vial (e.g., bottle, container, etc.) 490 for holding pills. In some examples, the indexer unit 400 may include the pill retainer 420 configured to temporarily hold pills that have fallen through the count chamber. In some examples, the pill retainer may be circular, and may include vertical dividers to form multiple compartments 480 in the pill retainer 420. The vial retainer 460 may retain the vial 490 and the release mechanism 430 may release pills into the retained vial 490. In some examples, the release mechanism 430 may include an actuator 432 that selectively moves gate to cover or expose an opening in a bottom of the pill retainer 420 that allows pills to fall through into the retained vial 490. In some examples, the vial 490 may be retained directly below the count chamber. In some modes of operation, the actuator 432 may hold the gate open such that the pills fall directly through from the count chamber and into the vial 490 without being temporarily retained. In some examples, the processor unit may keep track of a number of pills held in each compartment 480, and may cause the motor 410 to rotate the pill retainer 420 to a position to top off the retained vial 490 with the prescribed number of pills.

Figure 5:
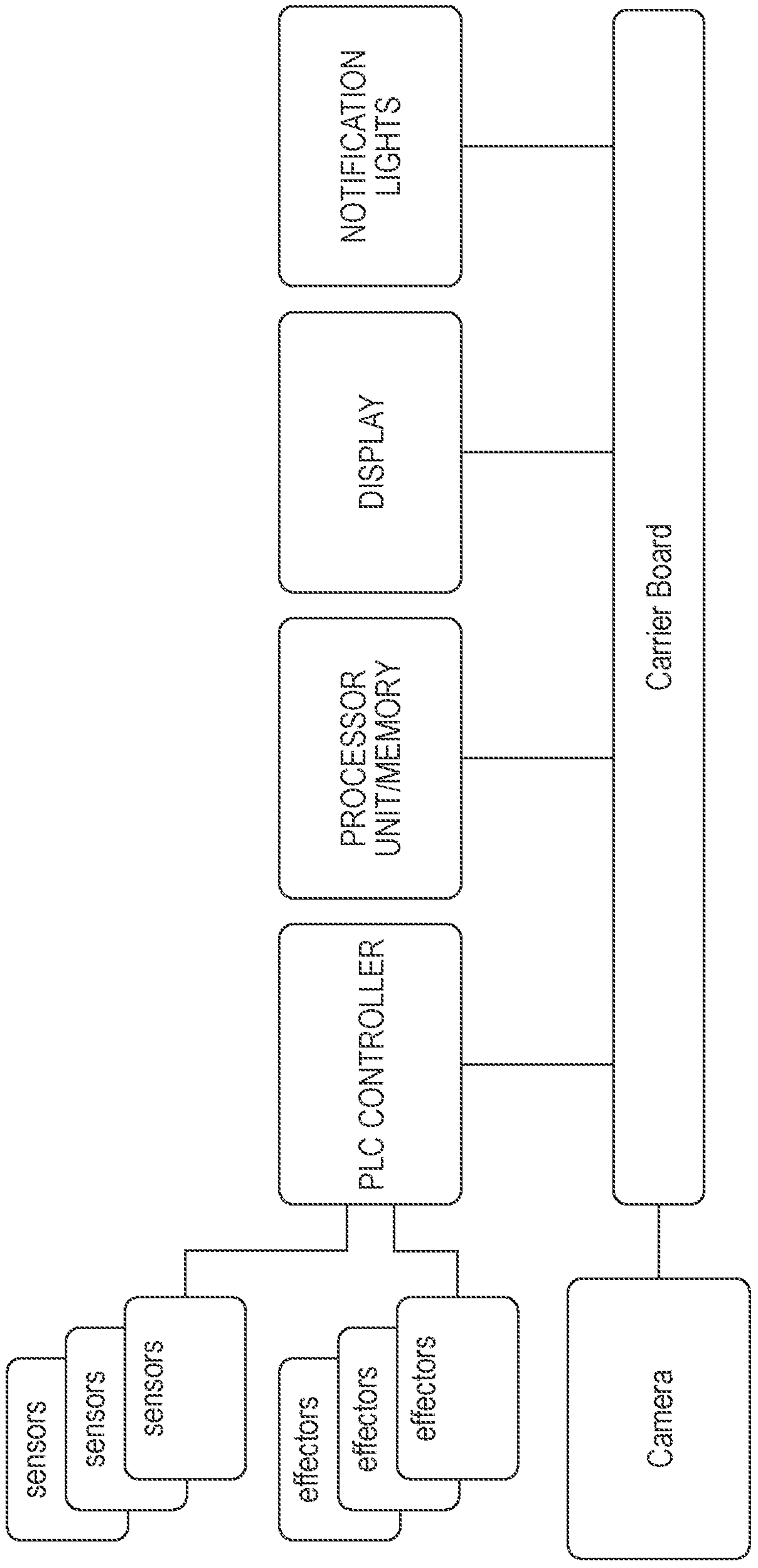
FIG. 5 depicts a block diagram of a control system for a pill counting device in accordance with embodiments of the disclosure.

FIG. 5 depicts a block diagram of a control system 500 for a pill counting device in accordance with embodiments of the disclosure. The control system 500 may include various sensors to sense operational status of the pill counting device, various effectors to control states of various components of the pill counting device, a PLC controller, a processor unit and memory to control operation of the pill counting device, a display with a user interface, notification lights, a carrier board to provide communication between a camera and other components of the control system. The control system 160 and the display 150 of FIGS. 1A and 1B may implement the control system 500 in some examples.

Figure 6:
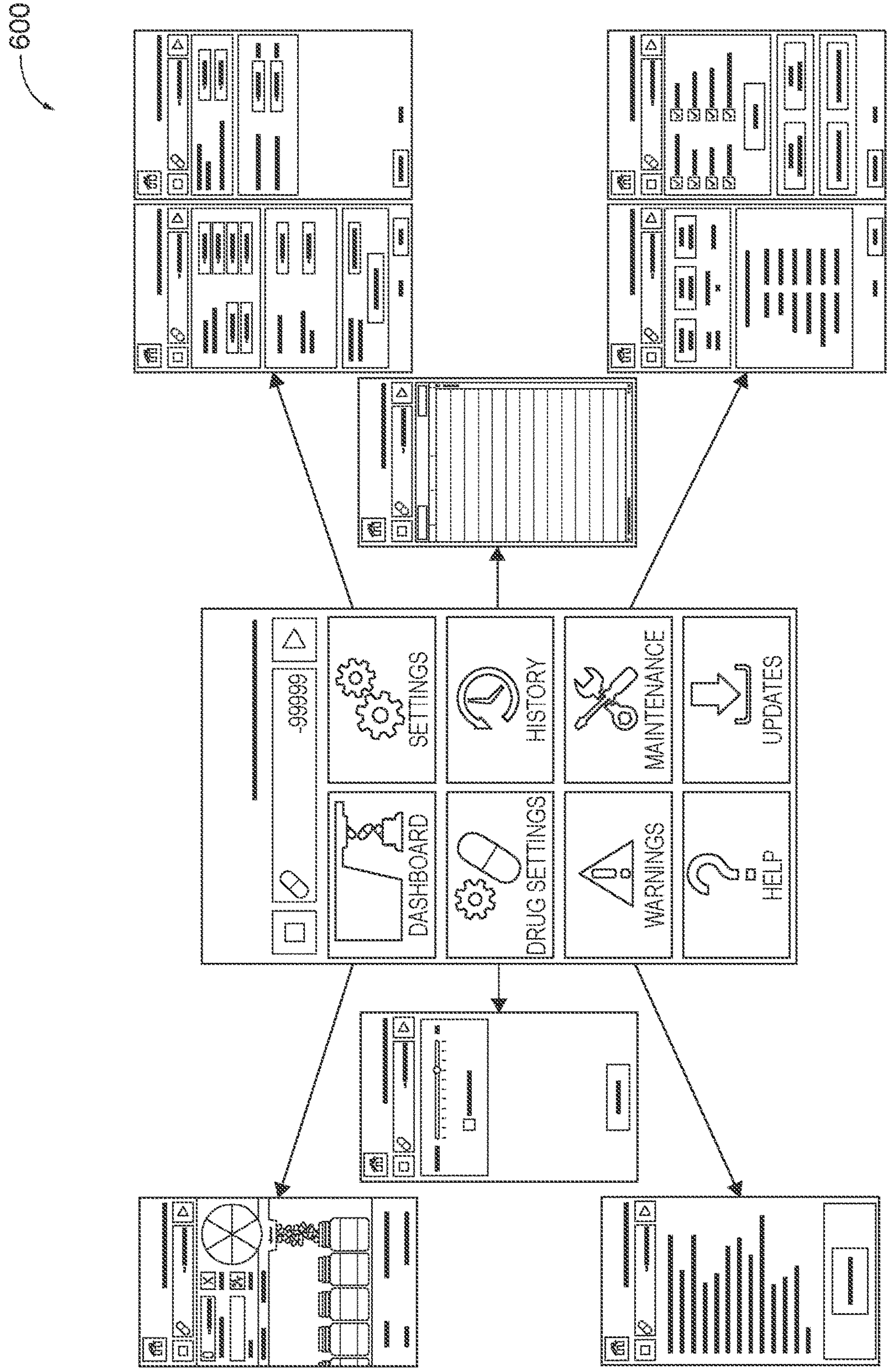
FIG. 6 depicts exemplary user interfaces screenshots for the pill counting device in accordance with embodiments of the disclosure.
Figure 7:
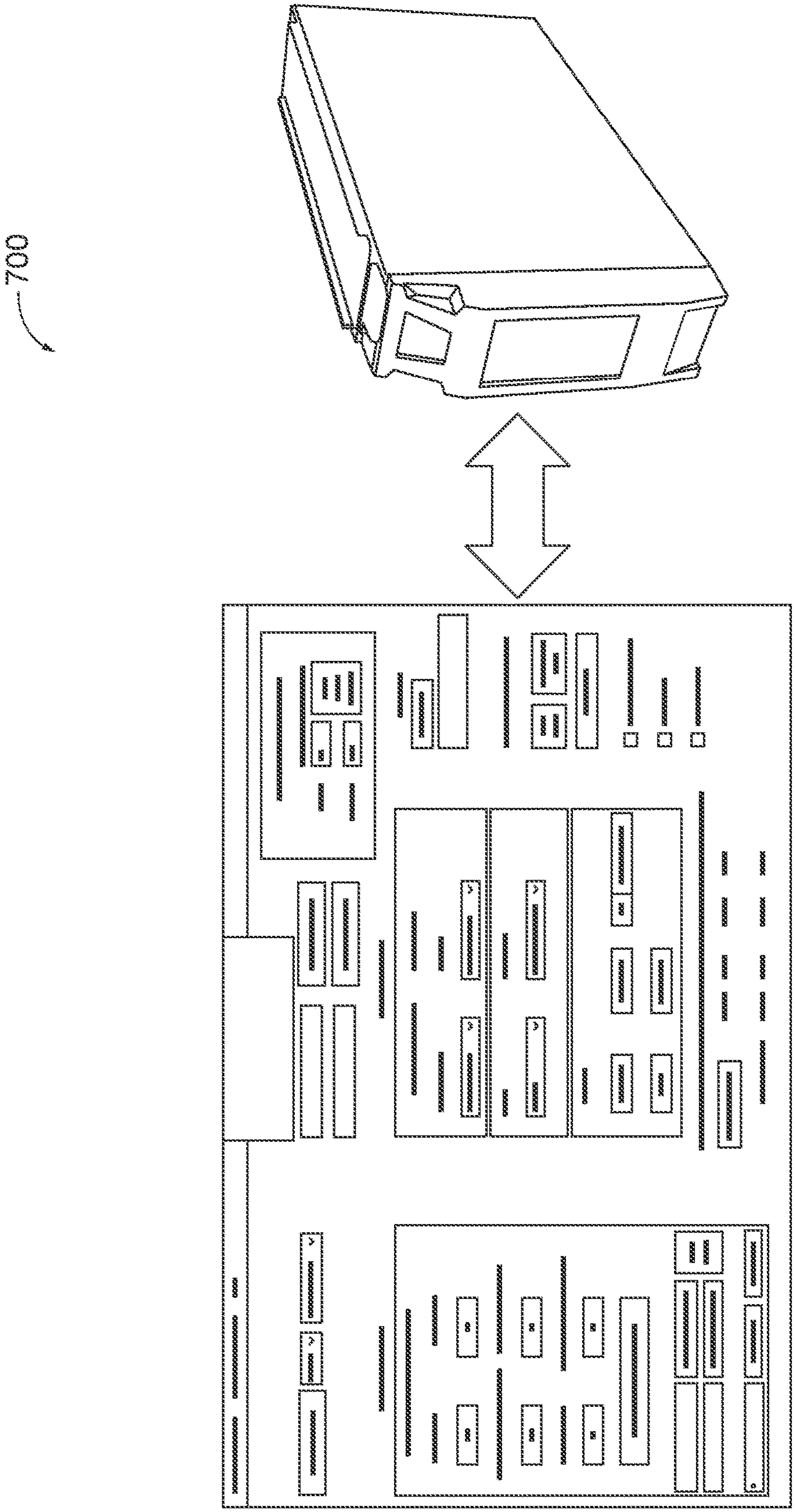
FIG. 7 depicts an exemplary user interface screenshots for remote control/monitoring of the pill counting device in accordance with embodiments of the disclosure.

In some examples, the display, the processor unit and memory, and the notification lights may be configured to provide a user interface. As an example, FIG. 6 depicts exemplary user interfaces screenshots 600 for the pill counting device in accordance with embodiments of the disclosure. The user interface may provide data for monitoring the pill counting device, selections to change various operational parameters, alert notifications, etc. In some examples, the pill counting device may be configured to remotely connect to an administrative terminal to facilitate remote monitoring and control of the pill counting device. As an example, FIG. 7 depicts an exemplary user interface screenshots 700 for remote control/monitoring of the pill counting device in accordance with embodiments of the disclosure.

Various illustrative components, blocks, configurations, modules, and steps have been described above generally in terms of their functionality. Persons having ordinary skill in the art may implement the described functionality in varying ways for each particular application, but such implementation decisions should not be interpreted as causing a departure from the scope of the present disclosure.

Figure 8:
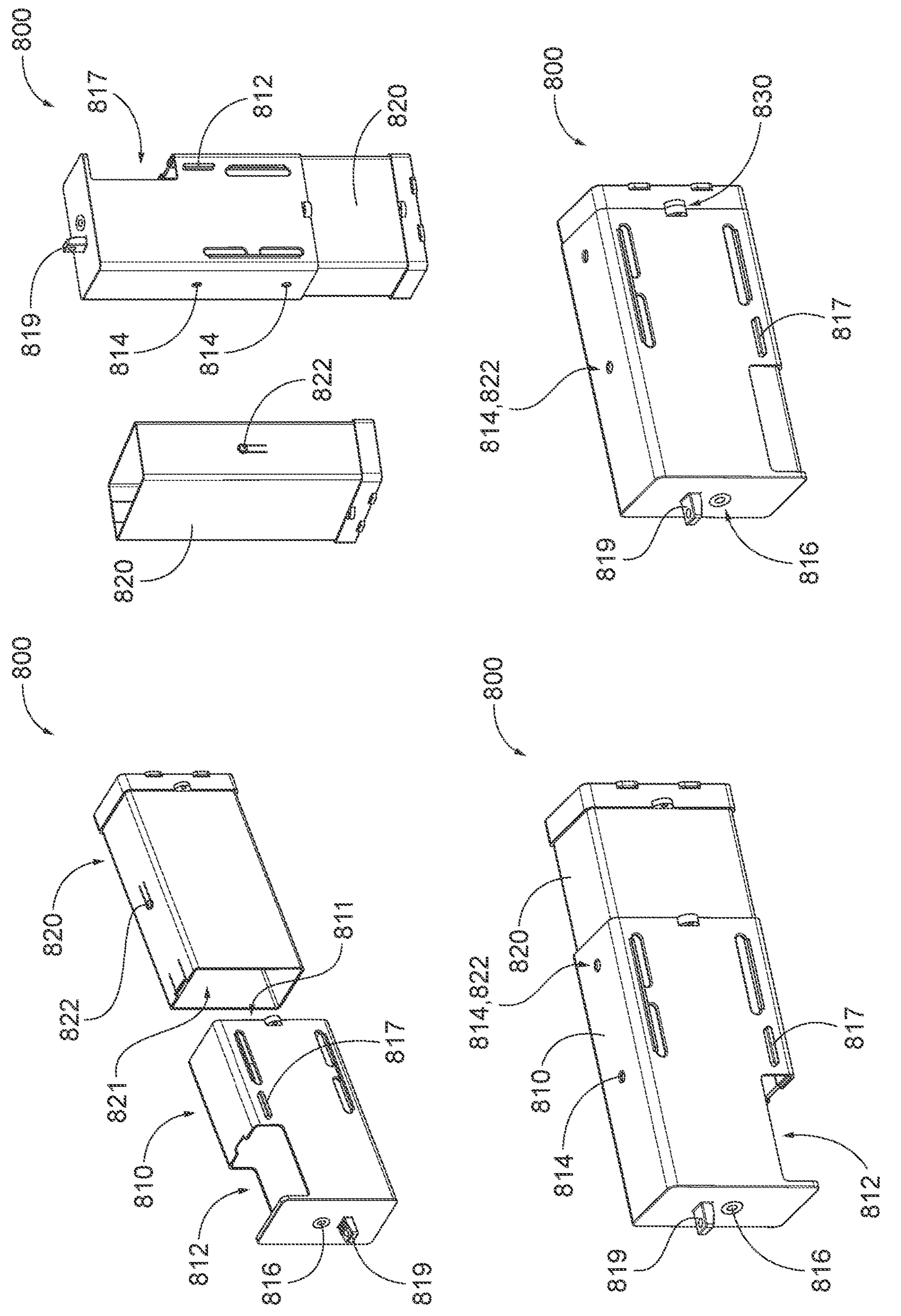
FIG. 8 depicts various views of a replenishment container or canister assembly 800 for a pill counting device in accordance with embodiments of the disclosure.

FIG. 8 depicts various views of a replenishment container or canister assembly 800 for a pill counting device in accordance with embodiments of the disclosure. The 800 may include a product container 820 and a sleeve 810. The 820 may have a substantially square or rectangular prism shape with one end 821 open and an opposing end closed. In some examples, each side of the product container 820 may have a common height and width and each side of the sleeve 810 may have a common height and width. In other examples, sides of the product container 820 may have a different heights and/or widths and each side of the sleeve 810 may have different heights and/or widths. In other examples, the product container 820 and/or the sleeve 810 may having a cylindrical shape, an elliptical cylindar shape, a triangular prism shape, a prism shape with more than four sides, etc., without departing from the scope of the disclosure.

Product or pills to be counted may be loaded into the 820 at the open end 821. In some examples, the closed end of the product container 820 may be formed or installed such that it is permanently affixed or attached to the sidewalls. In other examples, the closed end of the product container 820 may include a removable or hinged lid that can be removed/opened and replaced/closed. The outer (and/or inner) corners of the product container 820 may be rounded or beveled. The replenishment container 800 may be configured to use with a pill counting device described herein, such as the pill counting device 100 of FIGS. 1A and 1B.

The product container 820 may be configured to slide into an open end 811 of the sleeve 810. The sleeve 810 may have shape similar to the product container 820, with a slightly larger opening at the open end 811 than the outside perimeter of the end 821 of the product container 820 to accommodate insertion of the product container 820. The sleeve 810 and product container 820 may have a latching assembly to retain the product container 820 in the sleeve 810. In some examples, the latching assembly may include a resilient button 822 positioned on one face of the product container 820 and one or more apertures 814 in a corresponding face of the sleeve 810 that horizontally align with the resilient button 822. As the product container 820 is inserted into the sleeve 810, the resilient button 822 may protrude into an aperture 814 such that the product container 820 is restrained from sliding in either direction. To move the product container 820 further into or to remove the product container 820 from the sleeve 810, the portion of the resilient button 822 may be pressed down to release it from the aperture 814, allowing the product container 810 to slide in either direction.

Once inserted into the sleeve 810, the replenishment container or canister assembly 800 may be in an open or closed position. The bottom, left figure depicts an open position, and the bottom, right figure depicts a closed position. As shown in the bottom, right figure, the closed position is includes the product container 820 being fully inserted into the sleeve 810 such that an opening 812 in a face of the sleeve 810 is completely obstructed by a corresponding face or faces of the product container 820 and the resilient button 822 aligns with a closed position aperture 814 of the latching assembly. While in the closed position, a zip tie or some other attachment element may be inserted through an aperture in aligned ears or tabs 830 to lock the product container 820 to the sleeve 810 to prevent access to the contents of the product container. The zip tie or other attachment mechanism may include a tag that includes information identifying the contents of the product container 820. To move the product container 820 to the open position, the zip tie or other attachment mechanism may be removed from the ears or tabs 830 and the product container 820 may be slid out until the resilient button 822 reaches the upper aperture 814 of the sleeve, as shown in the bottom, right figure.

The sleeve 810 may include channel guides 817 configured to guide and secure the replenishment container or canister assembly 800 within a docking assembly mounted on a pill counting device. The sleeve 810 may further include a magnet 816 to further secure the replenishment container or canister assembly 800 to the docking assembly. The sleeve 810 may further include a locking tab 819 that may be used to secure the replenishment container or canister assembly 800 to the docking assembly.

Figure 9:
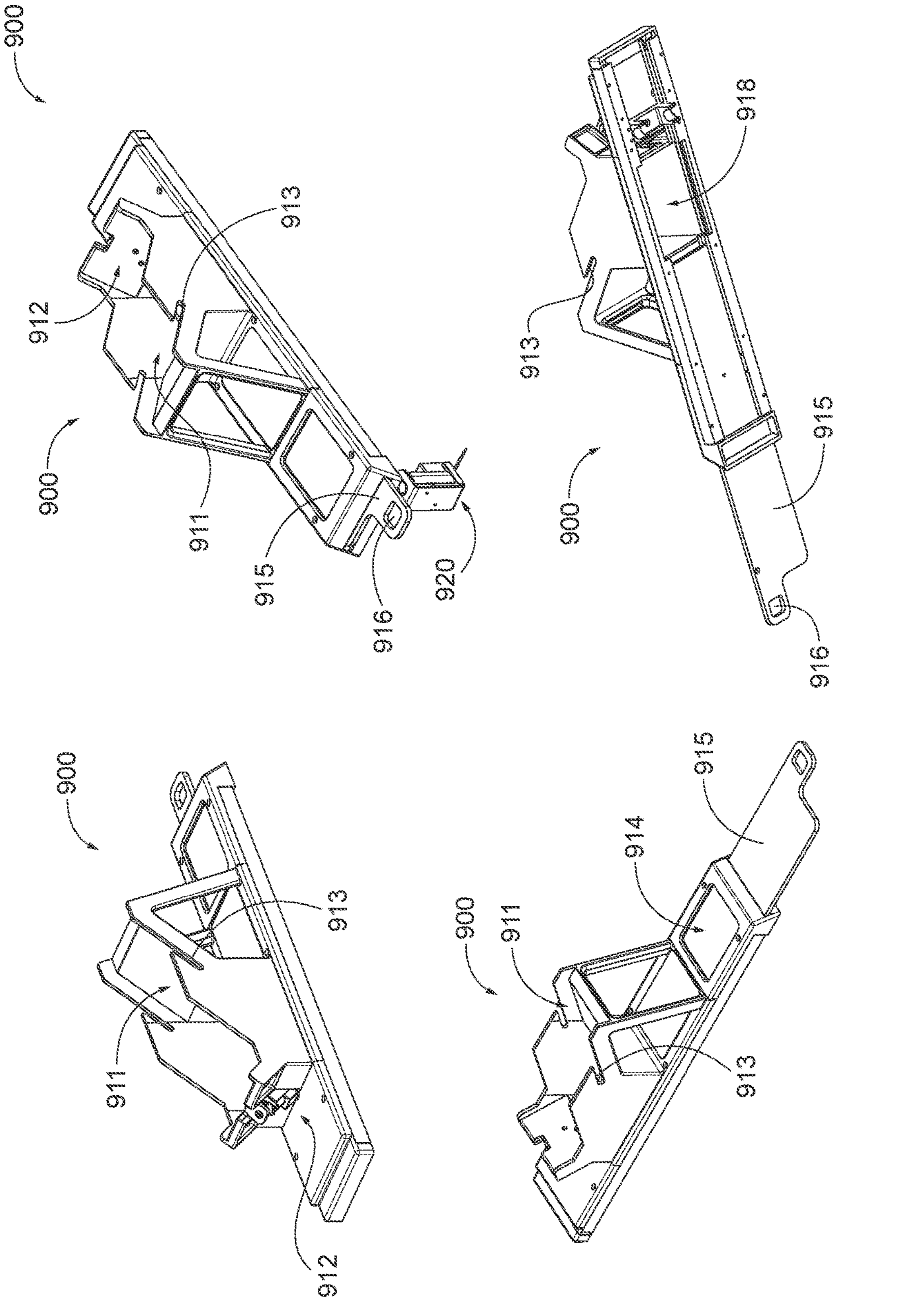
FIG. 9 depicts various views of a docking assembly 900 for a pill counting device in accordance with embodiments of the disclosure.

FIG. 9 depicts various views of a docking assembly 900 for a pill counting device in accordance with embodiments of the disclosure. The replenishment container 800 may be configured to use with a pill counting device described herein, such as the pill counting device 100 of FIGS. 1A and 1B.

The docking assembly 900 may include a receiver assembly 911 configured to receive a replenishment container or canister assembly (e.g., the replenishment container or canister assembly 800 of FIG. 8), with guide channels 913 on either side to receive channel guides 817 on the sleeve 810 of the replenishment container or canister assembly 800 of FIG. 8. The docking assembly 900 may include a first locking solenoid 912 configured to insert a pin into a locking tab 819 on the sleeve 810 of FIG. 8 to prevent removal of the replenishment container or canister assembly 800. The docking assembly 900 may further include a sliding gate 915 that is configured to selectively expose or cover an opening 918 in a bottom of the docking assembly 900 that aligns with an opening on top of the housing of the pill counting device to allow (or prevent) the pill counting device from being filled with contents of the replenishment container or canister assembly 800 of FIG. 8. The docking assembly 900 may further include a second locking solenoid 920 that is configured to prevent the sliding gate from being opened by sliding a pin into a locking tab 916 on the sliding gate 915.

Figure 10:
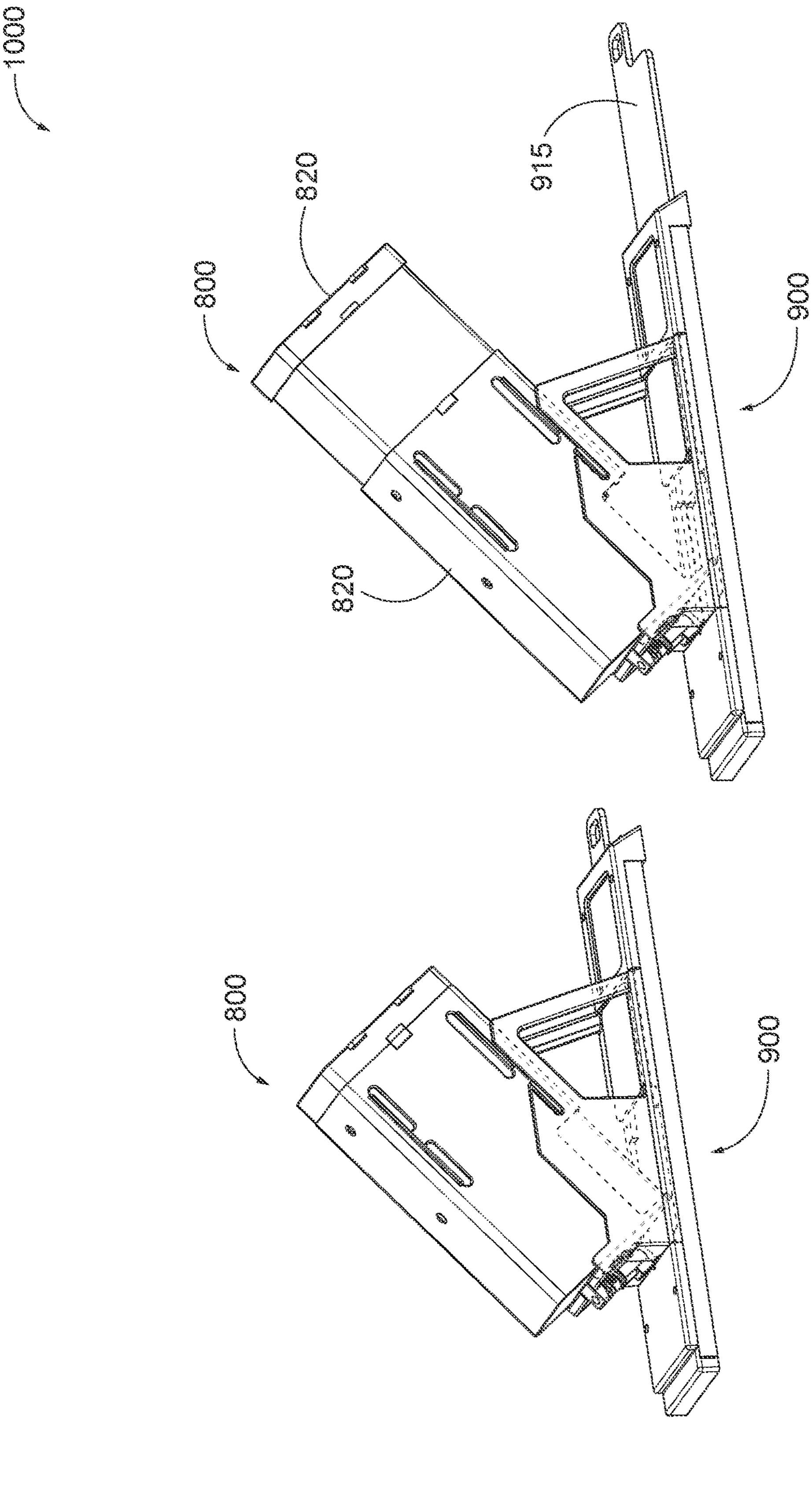
FIG. 10 depicts various views 1000 of a docking assembly 900 with a replenishment container or canister assembly 800 installed therein, for a pill counting device in accordance with embodiments of the disclosure.

FIG. 10 depicts various views 1000 of a docking assembly 900 with a replenishment container or canister assembly 800 installed therein, for a pill counting device in accordance with embodiments of the disclosure. FIG. 10 includes elements that have been previously described with respect to the replenishment container or canister assembly 800 of FIG. 8 and the docking assembly 900 of FIG. 9. Those elements have been identified in FIG. 10 using the same reference numbers used in FIGS. 8 and/or 9 and operation of the common elements is as previously described. Consequently, a detailed description of the operation of these particular elements will not be repeated in the interest of brevity.

In the left figure, the replenishment container or canister assembly 800 is installed in the docking assembly 900, and is retained in a closed position. In the right figure, the replenishment container or canister assembly 800 is installed in the docking assembly 900, and is retained in an open position. The sliding gate 915 is also depicted in an open position to allow product to transfer into the pill counting device (e.g., into the pill counting device 100 of FIGS. 1A and 1B).

Figure 11:
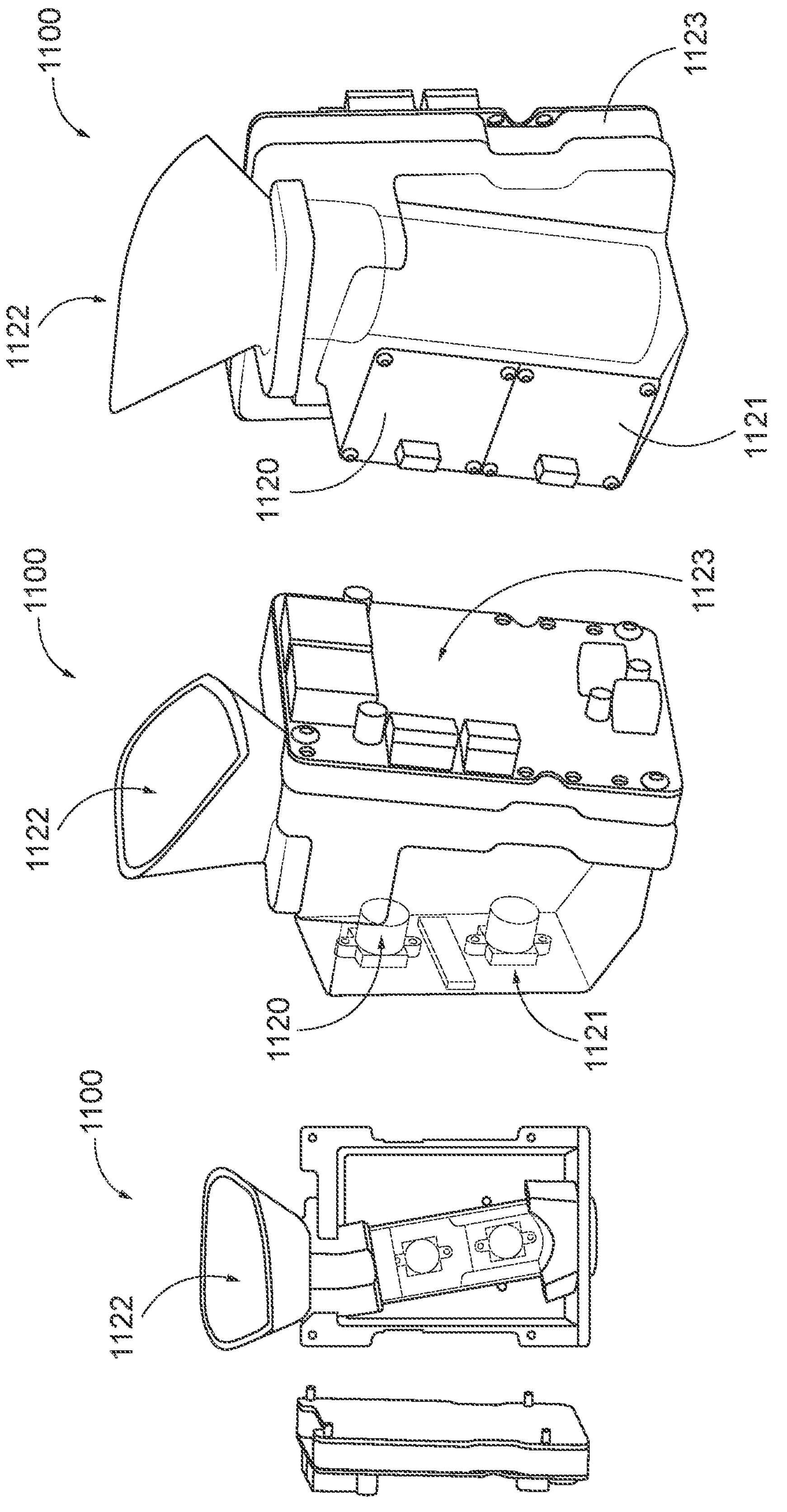
FIG. 11 depicts various views of a dual-camera count chamber 1100 accordance with embodiments of the disclosure.

FIG. 11 depicts various views of a dual-camera count chamber 1100 accordance with embodiments of the disclosure. The dual-camera count chamber 1100 may include a pair of cameras (or other image capturing device) 1120 and 1121 configured to capture images of objects falling through an opening 1122 in the dual-camera count chamber 1100. The pair of camera 1120 and 1121 may be mounted in different vertical planes (e.g., mounted vertically with respect to one another). In some examples, the two cameras may be mounted in a common horizontal plane, such that the camera 1120 is mounted directly above the camera 1121 on the dual-camera count chamber 1100. In some examples, the dual-camera count chamber 1100 may include a backlight or other light source (such as a direct light) 1123 to illuminate the pills as they fall through the dual-camera count chamber 1100. In some examples, the cameras 1120 and 1121 may share the same backlight system 1123. The count chamber 130 of FIGS. 1A and 1B may implement the dual-camera count chamber 1100 in some examples.

The images from the cameras 1120 and 1121 may be provided to a processor unit to determine one or more characteristics of an object as it falls through the opening of the dual-camera count chamber 1100. In some examples, the predetermined characteristic may include an area, such that if the captured object has a total area that is equal to and/or greater than a predetermined threshold area, then the processor unit may increment a counter. Other characteristics may include length, width, depth, color, shape, opaqueness, etc., or any combination thereof. In some examples, the predefined criteria may be set via a user interface.

The images from each camera 1120 and 1121 may be processed independently of one another. If the one or more determined characteristics match predefined criteria, the processor unit may increment a respective counter for each camera image associated with each camera 1120 and 1121. If the count associated with the camera 1120 is different than a count associated with the camera 1121, the processor may select the lower of the two counts as an official count, in some examples. If the count difference between the two cameras 1120 and 1121 exceeds an error threshold (e.g., a difference or discrepancy of three or more pills), the processor may set a fault to indicate a problem with one of the cameras. In some examples, the dual-camera count chamber 1100 may include similar mounting mechanisms as the count chamber 300 of FIGS. 3A-3B to mount the dual-camera count chamber 1100 within the pill counting device. In some examples, the two counter values corresponding the cameras 1120 and 1121 are both sent from the pill counting device 100 to a pharmacy control system, and the pharmacy control system may address counter discrepancies, including selecting a lower one of the count values and/or triggering a fault if the count discrepancy exceeds the error threshold. When the pharmacy control system detects a fault, the vial being filled may be routed to an exception processing location.

Figure 12:
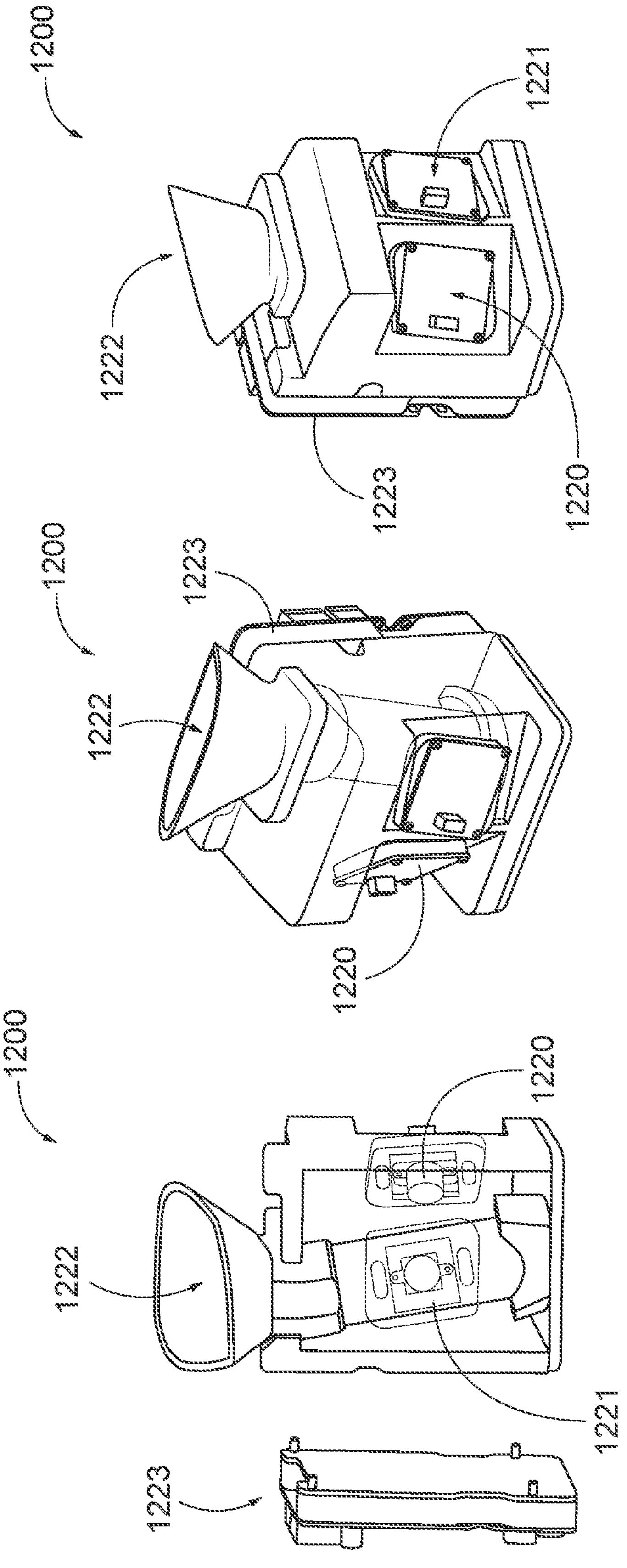
FIG. 12 depicts various views of a dual-camera count chamber 1200 accordance with embodiments of the disclosure.

FIG. 12 depicts various views of a dual-camera count chamber 1200 accordance with embodiments of the disclosure. The dual-camera count chamber 1200 may include a pair of cameras (or other image capturing device) 1220 and 1221 configured to capture images of objects falling through an opening 1222 in the dual-camera count chamber 1200. The pair of camera 1220 and 1221 may be mounted in different horizontal planes (e.g., mounted horizontally with respect to one another). In some examples, the two cameras may be mounted in a common vertical plane, such that the camera 1220 is mounted horizontally adjacent to the camera 1221 on the dual-camera count chamber 1200. In some examples, the cameras 1220 and 1221 may be mounted less than 90 degrees apart around the opening 1222. In some examples, the cameras 1220 and 1221 may be mounted between and including 45 and 75 degrees apart around the opening 1222. In some examples, the cameras 1220 and 1221 may be mounted approximately 60 degrees apart around the opening 1222. In some examples, the dual-camera count chamber 1200 may include a backlight or other light source (such as a direct light) 1223 to illuminate the pills as they fall through the dual-camera count chamber 1200. In some examples, the cameras 1220 and 1221 may share the same backlight system 1223. The count chamber 130 of FIGS. 1A and 1B may implement the dual-camera count chamber 1200 in some examples.

The images from the cameras 1220 and 1221 may be provided to a processor unit to determine one or more characteristics of an object as it falls through the opening of the dual-camera count chamber 1200. In some examples, the predetermined characteristic may include an area, such that if the captured object has a total area that is equal to and/or greater than a predetermined threshold area, then the processor unit may increment a counter. Other characteristics may include length, width, depth, color, shape, opaqueness, etc., or any combination thereof. In some examples, the predefined criteria may be set via a user interface.

The images from each camera 1220 and 1221 may be processed independently of one another. If the one or more determined characteristics match predefined criteria, the processor unit may increment a respective counter for each camera image associated with each camera 1220 and 1221. If the count associated with the camera 1220 is different than a count associated with the camera 1221, the processor may select the lower of the two counts as an official count, in some examples. If the count difference between the two cameras 1220 and 1221 exceeds an error threshold (e.g., a difference or discrepancy of three or more pills), the processor may set a fault to indicate a problem with one of the cameras. In some examples, the dual-camera count chamber 1100 may include similar mounting mechanisms as the count chamber 300 of FIGS. 3A-3B to mount the dual-camera count chamber 1200 within the pill counting device. In some examples, the two counter values corresponding the cameras 1120 and 1121 are both sent from the pill counting device 100 to a pharmacy control system, and the pharmacy control system may address counter discrepancies, including selecting a lower one of the count values and/or triggering a fault if the count discrepancy exceeds the error threshold.

When the pharmacy control system detects a fault, the vial being filled may be routed to an exception processing location.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. A pill counting device, comprising:

a step feeder comprising a set of movable slats interleaved with a set of fixed slats, wherein a top platform of each of the set of movable slats are vertically offset from adjacent ones of the set of movable slats, wherein (i) the top platform of one of the set of movable slats is configured to move vertically from a top platform of a first fixed slat of the set of fixed slats to a top platform of a second a second fixed slat of the set of fixed slats to carry a plurality of pills from the first fixed slat to the second fixed slat and (ii) a top movable slat of the set of movable slats is configured to orient a subset of the plurality of pills into a row of pills and to feed one or more individual pills of the row of pills out of the step feeder;

a count chamber comprising (i) a tube configured to receive the one or more individual pills of the row of pills from the step feeder and (ii) a camera configured to capture an image of an individual pill of the one or more individual pills as the individual pill falls through the tube; and a control system configured to control movement of the set of movable slats of the step feeder and to control capturing of images by the camera, wherein the control system is further configured to: (i) calculate a characteristic of the individual pill from the image and to increment a pill counter in response to the characteristic of the individual pill meeting predefined criteria and (ii) determine whether a pill quota has been met based on the pill counter.

2. The pill counting device of claim 1, wherein the control system is configured to calculate an area of the individual pill from the image and to increment the pill counter in response to the calculated area being greater than a predefined area.

3. The pill counting device of claim 1, wherein the top movable slat is angled such that the one or more individual pills are fed to the count chamber in a cascading manner as the top movable slat moves vertically.

4. The pill counting device of claim 1, further comprising an indexer unit comprising a pill retainer configured to receive the one or more individual pills of the row of pills after they fall through the count chamber.

5. The pill counting device of claim 4, wherein the pill retainer includes a plurality of compartments, wherein the control system is configured to cause the pill retainer to rotate to control which of the plurality of compartments are below the count chamber.

6. The pill counting device of claim 5, wherein the control system is configured to maintain a count of pills in each of the plurality of compartments.

7. The pill counting device of claim 5, wherein the control system is configured to cause the pill retainer to rotate to align a particular compartment of the plurality of compartments over a vial to be filled.

8. The pill counting device of claim 7, wherein the indexer unit includes a vial retainer configured to retain the vial to be filled.

9. The pill counting device of claim 7, wherein the indexer unit includes an actuator configured to open a gate in a floor of the pill retainer to release retained pills to the vial to be filled.

10. The pill counting device of claim 1, wherein:

(i) the count chamber further comprises a second camera configured to capture a second image of the individual pill of the one or more individual pills as the individual pill falls through the tube, (ii) the control system is further configured to: (a) calculate the characteristic of the individual pill from the second image and to increment a second pill counter in response to the characteristic of the individual pill meeting predefined criteria and (b) select a greater value between the pill counter and the second pill counter to determine whether the pill quota has been met.

11. The pill counting device of claim 10, wherein the camera is mounted in a different vertical plane of the count chamber than the second camera.

12. The pill counting device of claim 11, wherein the camera is mounted directly above the second camera on the count chamber.

13. The pill counting device of claim 11, wherein the camera is mounted in a different horizontal plane of the count chamber than the second camera.

14. The pill counting device of claim 13, wherein the camera and the second camera are mounted between 45 and 75 degrees apart on the counter count chamber.

15. The pill counting device of claim 1, further comprising:

a hopper configured to feed the plurality of pills to the step feeder; and a docking assembly configured to receive a replaceable replenishment container, wherein the docking assembly is configured to facilitate transfer of the plurality of pills from the replaceable replenishment container to the hopper.

16. The pill counting device of claim 15, wherein the docking assembly comprises a receiver assembly having guide channels to receive channel guides of the replaceable replenishment container.

17. The pill counting device of claim 15, wherein the docking assembly comprises a locking solenoid configured to interface with a locking tab of the replaceable replenishment container to secure the replaceable replenishment container to the docking assembly.

18. The pill counting device of claim 15, wherein the docking assembly further comprises a sliding gate configured to control flow of the plurality of pills from the replaceable replenishment container to the hopper by aligning an opening in the sliding gate with an opening into the hopper.

19. The pill counting device of claim 15, wherein the replaceable replenishment container comprises a product container inserted into a sleeve, wherein, in a closed position, an opening the sleeve is blocked to prevent release of the plurality of pills to the docking assembly and in an open position, the opening in the sleeve is exposed to allow release of the plurality of pills to the docking assembly from the product container.

20. A method, comprising:

transferring, via a step feeder of a pill counting device, a plurality of pills from a hopper to a top platform of the step feeder via a set of movable slats interleaved with a set of fixed slats;

controlling movement of a top movable slat of the set of movable slats to (i) orient a subset of the plurality of pills into a row of pills of the plurality of pills formed on the top latform of the step feeder and (ii) feed an individual pill from the row of pills to a count chamber;

capturing, via a camera of the pill counting device, an image of the individual pill as the individual pill falls through the count chamber;

calculating a characteristic of the individual pill based on the image of the individual pill; and incrementing a pill counter of the pill counting device in response to the characteristic of the individual pill meeting predefined criteria.

21. The method of claim 20, further comprising:

calculating an area of the individual pill from the image as the characteristic; and incrementing the pill counter in response to the calculated area being greater than a predefined area.

22. The method of claim 20, further comprising receiving the individual pill after it falls through the count chamber at a compartment of a plurality of compartments of a pill retainer of the pill counting device.

23. The method of claim 22, further comprising causing the pill retainer to rotate to control which of the plurality of compartments are below the count chamber.

24. The method of claim 23, further comprising maintaining a count of pills in each of the plurality of compartments.

25. The method of claim 20, further comprising:

capturing, via a second camera, a second image of the individual pill as the individual pill falls through the count chamber;

calculating the characteristic of the individual pill from the second image; and incrementing a second pill counter of the pill counting device in response to the characteristic of the individual pill from the second image meeting the predefined criteria.

26. The method of claim 25, further comprising selecting a greater value between the pill counter and the second pill counter to determine whether a pill quota has been met.

27. The method of claim 25, wherein the camera is mounted in a different vertical plane of the count chamber than the second camera.

28. The method of claim 25, wherein the camera is mounted directly above the second camera on the count chamber.

29. The method of claim 25, wherein the camera is mounted in a different horizontal plane of the count chamber than the second camera.

30. The method of claim 29, wherein the camera and the second camera are mounted between 45 and 75 degrees apart on the count chamber.

* * * * *